US012614022B2

(12) United States Patent　　(10) Patent No.: US 12,614,022 B2
Wu et al.　　　　　　　　　　　　(45) Date of Patent: Apr. 28, 2026

(54) METHOD, APPARATUS, ELECTRONIC DEVICE AND COMPUTER READABLE STORAGE MEDIUM FOR TASK CREATION

(71) Applicant: BEIJING ZITIAO NETWORK TECHNOLOGY CO., LTD., Beijing (CN)

(72) Inventors: Danni Wu, Beijing (CN); Jian Sun, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 180 days.

(21) Appl. No.: 18/572,572

(22) PCT Filed: Sep. 13, 2022

(86) PCT No.: PCT/CN2022/118491
§ 371 (c)(1),
(2) Date: Dec. 20, 2023

(87) PCT Pub. No.: WO2023/040833
PCT Pub. Date: Mar. 23, 2023

(65) Prior Publication Data
US 2024/0289541 A1　　Aug. 29, 2024

(30) Foreign Application Priority Data
Sep. 14, 2021　　(CN) .......................... 202111076151.1

(51) Int. Cl.
*G06F 40/174*　　(2020.01)
*G06F 40/134*　　(2020.01)

(52) U.S. Cl.
CPC .......... *G06F 40/174* (2020.01); *G06F 40/134* (2020.01)

(58) Field of Classification Search
CPC .... G06F 40/174; G06F 40/134; G06F 3/0481; G06F 16/168
See application file for complete search history.

(56) References Cited

U.S. PATENT DOCUMENTS 10,623,359 B1　　4/2020　Rosenstein et al.
2007/0185832 A1*　8/2007　Kriebel ................. G06F 16/168
(Continued)

FOREIGN PATENT DOCUMENTS

CN　　1992615 A　　7/2007
CN　　106059895 A　　10/2016
(Continued)

OTHER PUBLICATIONS

International Search Report (with English translation) and Written Opinion issued in PCT/CN2022/118491, dated Nov. 30, 2022, 10 pages provided.
(Continued)

*Primary Examiner* — Asher D Kells
(74) *Attorney, Agent, or Firm* — Astute IP Law Group

(57) ABSTRACT

A method, apparatus, electronic device and computer-readable storage medium for task creation. The method includes: in response to a triggering operation of creating a first task for a single file message in a session, determining a first title name of the first task based on a file name of a file corresponding to the single file message; and creating the first task and filling the determined first title name in a title region of the first task.

18 Claims, 17 Drawing Sheets

(56) References Cited

U.S. PATENT DOCUMENTS

| | | | |
|---|---|---|---|
| 2010/0004921 A1* | 1/2010 | Hufnagel | G06F 40/56 |
| | | | 704/9 |
| 2014/0156623 A1* | 6/2014 | Guha | G06F 16/358 |
| | | | 707/706 |
| 2015/0363092 A1 | 12/2015 | Morton | |
| 2018/0129994 A1* | 5/2018 | Fowler | G06Q 10/107 |
| 2018/0130007 A1* | 5/2018 | Fowler | G06Q 10/109 |
| 2018/0322402 A1* | 11/2018 | Kulkarni | G06F 9/461 |
| 2020/0186371 A1 | 6/2020 | Shioya et al. | |
| 2020/0302404 A1* | 9/2020 | Shaya | G06Q 10/10 |
| 2020/0379822 A1* | 12/2020 | Berget | G06F 9/542 |
| 2023/0004727 A1* | 1/2023 | Oberoi | H04L 51/02 |

FOREIGN PATENT DOCUMENTS

| | | | |
|---|---|---|---|
| CN | 106571999 A | 4/2017 | |
| CN | 109146431 A | 1/2019 | |
| CN | 109766315 A | 5/2019 | |
| CN | 110291759 A | 9/2019 | |
| CN | 110581794 A | 12/2019 | |
| CN | 112732386 A | 4/2021 | |
| CN | 113285868 A | 8/2021 | |
| CN | 113741754 | 12/2021 | |

OTHER PUBLICATIONS

Chinese Office Action, issued in Chinese patent application No. 202111076151.1, dated Jan. 24, 2024, 18 pages (translation enclosed).

* cited by examiner

IN RESPONSE TO A TRIGGERING OPERATION OF CREATING A FIRST TASK FOR A SINGLE FILE MESSAGE IN A SESSION, DETERMINE A FIRST TITLE NAME OF THE FIRST TASK BASED ON A FILE NAME OF A FILE CORRESPONDING TO THE SINGLE FILE MESSAGE — S10

CREATE THE FIRST TASK AND FILL THE DETERMINED FIRST TITLE NAME IN A TITLE REGION OF THE FIRST TASK — S20

SEARCH

ALL   @ME   ONE-ON-ONE   UNREAD   MORE

USER B
OPERATION PERMISSION

USER B

FIRST XX.DOX 279.9KB

OPERATION PERMISSION

FISRT TASK TITLE

FIRST XX.DOX

CANCEL     CREATE

| ONGOING | ONGOING | TASK DETAILS |
|---|---|---|
| MY FOLLOWED | ☐ FIRST XX.DOX | 【FILE】 FIRST XX.DOX |
| | ☐ XXXXXXXX. | |
| | ☐ ///////... | |

OBTAIN A FILE NAME OF A FIRST FILE BASED ON A DISTRIBUTION OF THE AT LEAST TWO FILES CORRESPONDING TO THE SINGLE FILE MESSAGE IN THE SESSION, AND DETERMINE THE FILE NAME OF THE FIRST FILE AS THE FIRST TITLE NAME OF THE FIRST TASK — S11

CREATE THE FIRST TASK AND FILL THE DETERMINED FIRST TITLE NAME IN A TITLE REGION OF THE FIRST TASK — S20

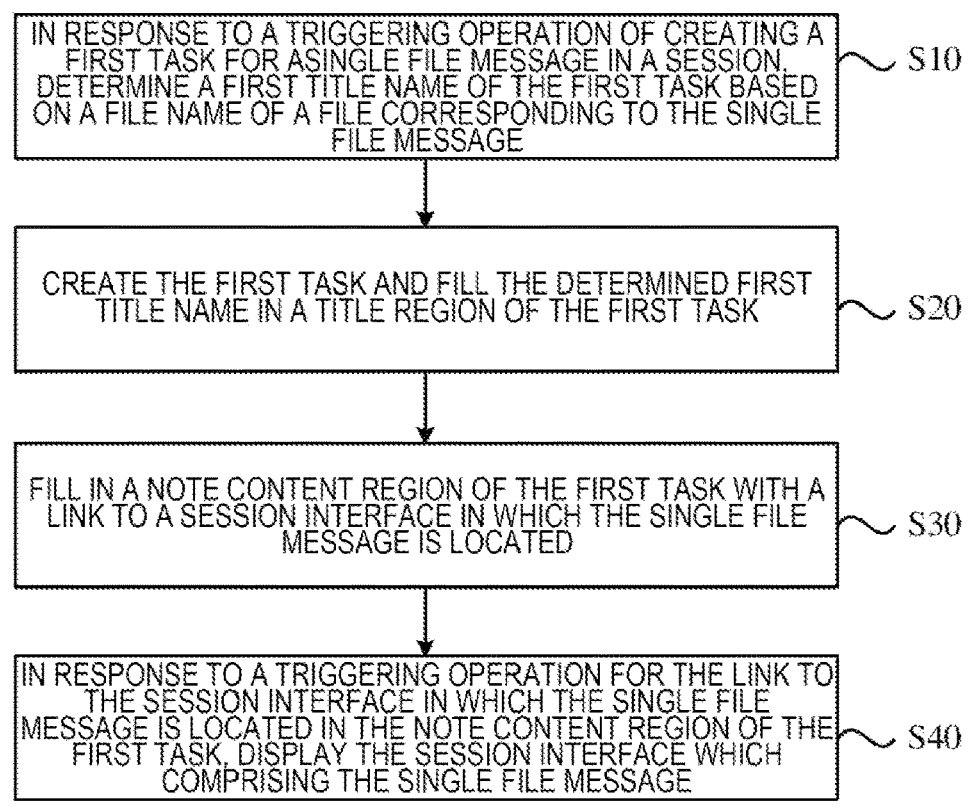

IN RESPONSE TO A TRIGGERING OPERATION OF CREATING A FIRST TASK FOR A SINGLE FILE MESSAGE IN A SESSION, DETERMINE A FIRST TITLE NAME OF THE FIRST TASK BASED ON A FILE NAME OF A FILE CORRESPONDING TO THE SINGLE FILE MESSAGE ∼ S10

CREATE THE FIRST TASK AND FILL THE DETERMINED FIRST TITLE NAME IN A TITLE REGION OF THE FIRST TASK ∼ S20

FILL IN A NOTE CONTENT REGION OF THE FIRST TASK WITH A LINK TO A SESSION INTERFACE IN WHICH THE SINGLE FILE MESSAGE IS LOCATED ∼ S30

IN RESPONSE TO A TRIGGERING OPERATION FOR THE LINK TO THE SESSION INTERFACE IN WHICH THE SINGLE FILE MESSAGE IS LOCATED IN THE NOTE CONTENT REGION OF THE FIRST TASK, DISPLAY THE SESSION INTERFACE WHICH COMPRISING THE SINGLE FILE MESSAGE ∼ S40

FIG. 11

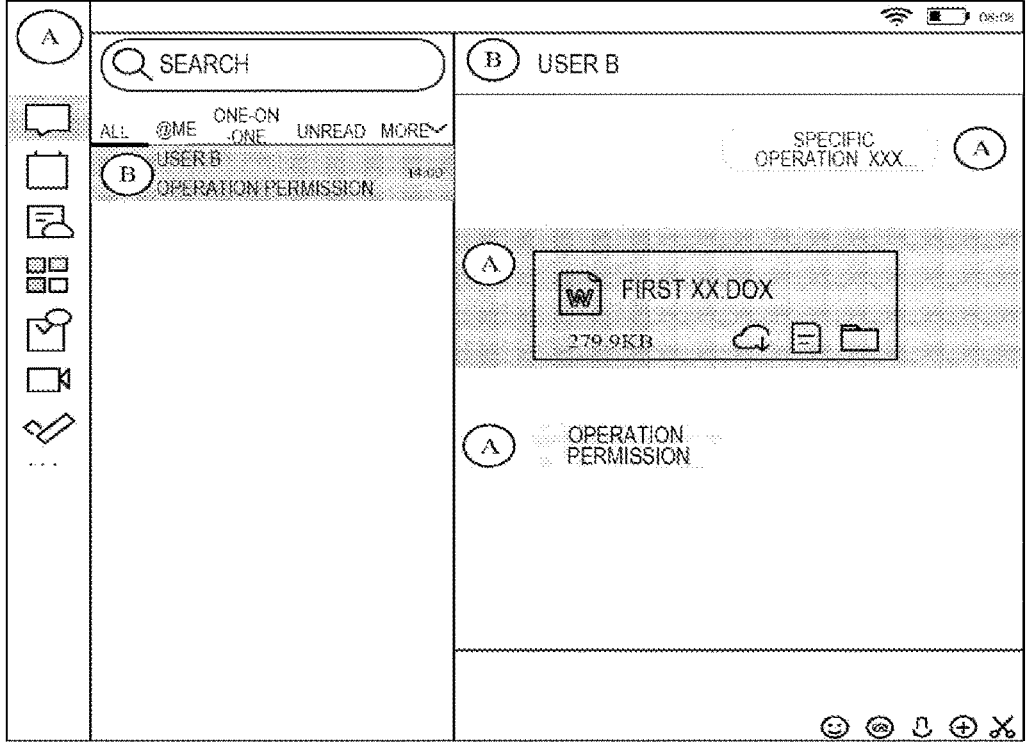

FIG. 12

IN RESPONSE TO A TRIGGERING OPERATION OF CREATING A SECOND TASK FOR AT LEAST TWO TARGET MESSAGES IN THE SESSION, DETERMINE A SECOND TITLE NAME OF THE SECOND TASK BASED ON AN OBJECT OF THE SESSION — S110

CREATE THE SECOND TASK AND FILLING THE DETERMINED SECOND TITLE NAME IN A TITLE REGION OF THE SECOND TASK — S120

IN RESPONSE TO A TRIGGERING OPERATION OF CREATING A SECOND TASK FOR AT LEAST TWO TARGET MESSAGES IN THE SESSION, DETERMINE A SECOND TITLE NAME OF THE SECOND TASK BASED ON AN OBJECT OF THE SESSION ～S110

↓

CREATE THE SECOND TASK AND FILL THE DETERMINED SECOND TITLE NAME IN A TITLE REGION OF THE SECOND TASK ～S120

↓

FILL IN A NOTE CONTENT REGION OF THE SECOND TASK WITH A LINK TO A SESSION CORRESPONDING TO THE AT LEAST TWO TARGET MESSAGES WHICH COMPRISING THE AT LEAST TWO TARGET MESSAGES ～S130

FIG. 17

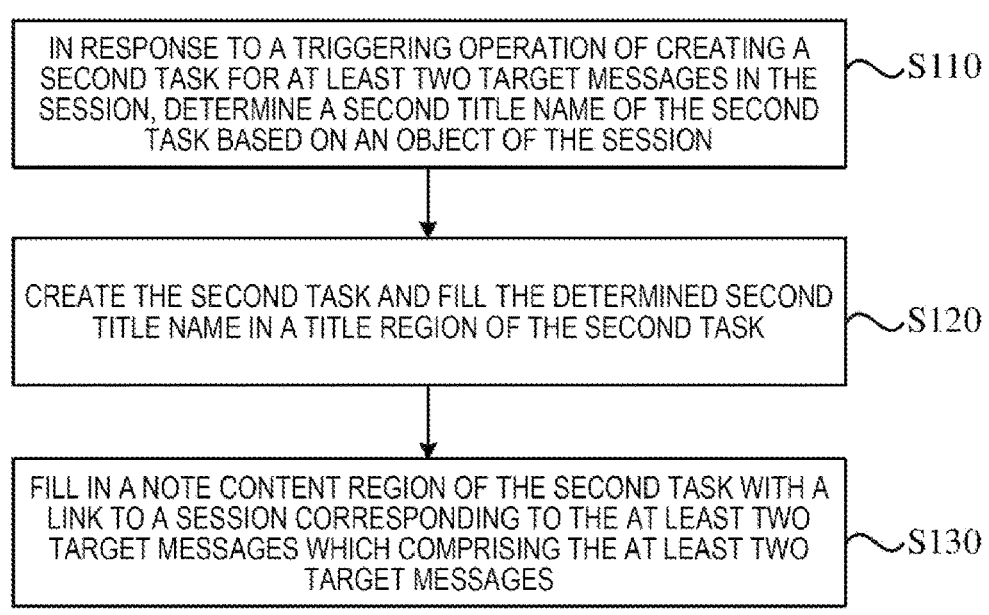

ONGOING

ONGOING

MY FOLLOWED

ADD TASK AND PRESS ENTER
KEY TO CREATE          CANCEL    CREATE

☐ FIRST XX.DOX

☐ XX XX X XX X...

☐ ZZZZZZZZZ...

☐ FROM SESSION: USER B

☐ ABOUT ASSIGNMENT ISSUE

ATTACH MENT
PICTURE
LINK
MORE

METHOD, APPARATUS, ELECTRONIC DEVICE AND COMPUTER READABLE STORAGE MEDIUM FOR TASK CREATION

CROSS REFERENCE

This application is based on Chinese Patent Application No. 202111076151.1, filed on Sep. 14, 2021, entitled "method, apparatus, electronic device, and computer readable storage medium for task creation", and claims priority to the Chinese Patent Application, the entirety of which is incorporated herein by reference.

FIELD

The present disclosure relates to the field of computers, and more particularly to a method, apparatus, electronic device, and computer readable storage medium for task creation.

BACKGROUND

With the popularity of instant messaging tools, users may apply different functions in instant messaging tools in the process of using instant messaging tools, e.g., a function of converting a session content to a task in instant messaging tools.

In the related art, when a user converts a session content to a task in a session interface of the instant messaging tool, a file corresponding to the session content is directly added to an attachment of the task, and then the user manually fills in the task title.

However, the efficiency of creating tasks using related art is not high.

SUMMARY

To solve the above technical problems, the present disclosure provides a method, apparatus, electronic device, and computer readable storage medium for task creation.

In a first aspect, the present disclosure provides a method of task creation comprising:

in response to a triggering operation of creating a first task for a single file message in a session, determining a first title name of the first task based on a file name of a file corresponding to the single file message; and creating the first task and filling the determined first title name in a title region of the first task.

In a second aspect, embodiments of the present disclosure provide an apparatus for task creation comprising:

a first task title determination module configured to in response to a triggering operation of creating a first task for a single file message in a session, determine a first title name of the first task based on a file name of a file corresponding to the single file message; and a first task creation module configured to create the first task and filling the determined first title name in a title region of the first task.

In a third aspect, the embodiments of the present disclosure provide an electronic device comprising:

one or more processors; and a storage device for storing one or more programs, the one or more programs, when executed by the one or more programs, causing the one or more processors to implement the method according to any of the first aspects.

In a fourth aspect, the embodiments of the present disclosure provide a non-transitory computer-readable storage medium having a computer program stored thereon, wherein the program, when executed by a processor, implements the method according to any of the first aspects.

BRIEF DESCRIPTION OF THE DRAWINGS

The accompanying drawings herein, which are incorporated in and constitute a part of this specification, illustrate embodiments conforming to the present disclosure, and together with the specification, serve to explain the principles of the present disclosure.

For clearer description of the technical solutions in the embodiments of the present disclosure or in the prior art, the accompanying drawings needed to be used in the description of the embodiments or the prior art will be briefly introduced below. Apparently, for those of ordinary skill in the art, it is said that other drawings can be obtained from these accompanying drawings without exerting creative labor.

FIG. 11 is a schematic flowchart of further method of task creation provided by the embodiments of the present disclosure;

FIG. 12 is a schematic diagram of further interface for task creation provided by the embodiments of the present disclosure;

FIG. 17 is a schematic flowchart of further method of task creation provided by the embodiments of the present disclosure;

FIG. 18 is a schematic diagram of further interface for task creation provided by the embodiments of the present disclosure;

FIG. 25 is a schematic diagram of further interface for task creation provided by the embodiments of the present disclosure;

FIG. 26 is a schematic diagram of further interface for task creation provided by the embodiments of the present disclosure;

DETAILED DESCRIPTION

To understand the above objects, features and advantages of the present disclosure more clearly, the following solutions of the present disclosure will be further described. It should be noted that, without conflict, the embodiments of the present disclosure and features in the embodiments may be combined with each other.

Many specific details are set forth in the following description in order to fully understand the present disclosure, but the present disclosure may also be implemented in other ways different from that described herein. Apparently, the embodiments in the specification are only part of the embodiments of the present disclosure, not all embodiments.

Exemplarily, the present disclosure provides a method, apparatus, an electronic device and a storage medium for task creation. In the use case of creating a task in a session, when a task is created in a session, a title name of the created task is determined based on the message in the session, and a session message is displayed in the title of the task, showing more effective information and reducing the workload of the user to fill the title.

Herein, the method of task creation of the disclosure is performed by an electronic device or an application program, a web page, a public account, etc. in the electronic device. The electronic device can be a tablet computer, a mobile phone, a wearable device, a vehicle-mounted device, an augmented reality (AR)/virtual reality (VR) device, a laptop computer, an ultra-mobile personal computer (UMPC), a netbook, a personal digital assistant (PDA), a smart TV, a smart screen, a high-definition TV, a 4K TV, a smart speaker, a smart projector, etc. The disclosure does not limit the specific type of electronic device.

Herein, the present disclosure does not limit the type of operating system of the electronic device. For example, Android system, Linux system, Windows system, iOS system, etc.

The technical solution of the present disclosure is described in detail below with several specific embodiments.

Figure 1:
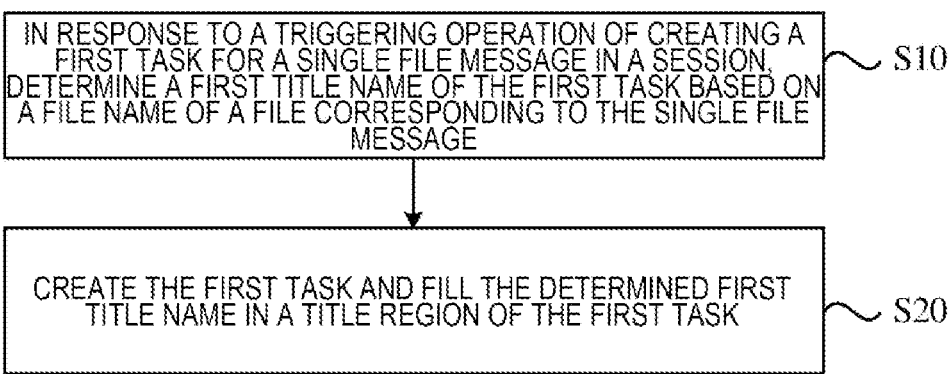
FIG. 1 is a schematic flowchart of a method of task creation provided by the embodiments of the present disclosure.

FIG. 1 is a schematic flowchart of a method of task creation provided by the embodiments of the present disclosure. As shown in FIG. 1, the method of the present embodiment is as follows:

S10, in response to a triggering operation of creating a first task for a single file message in a session, determine a first title name of the first task based on a file name of a file corresponding to the single file message.

Specifically, the file corresponding to the single file message may be an offline file, such as an offline document, a picture, a video, etc., and may also be an online file, such as a cloud document, a web page, a picture link, a video link, etc. The file includes one or more.

Figure 2:
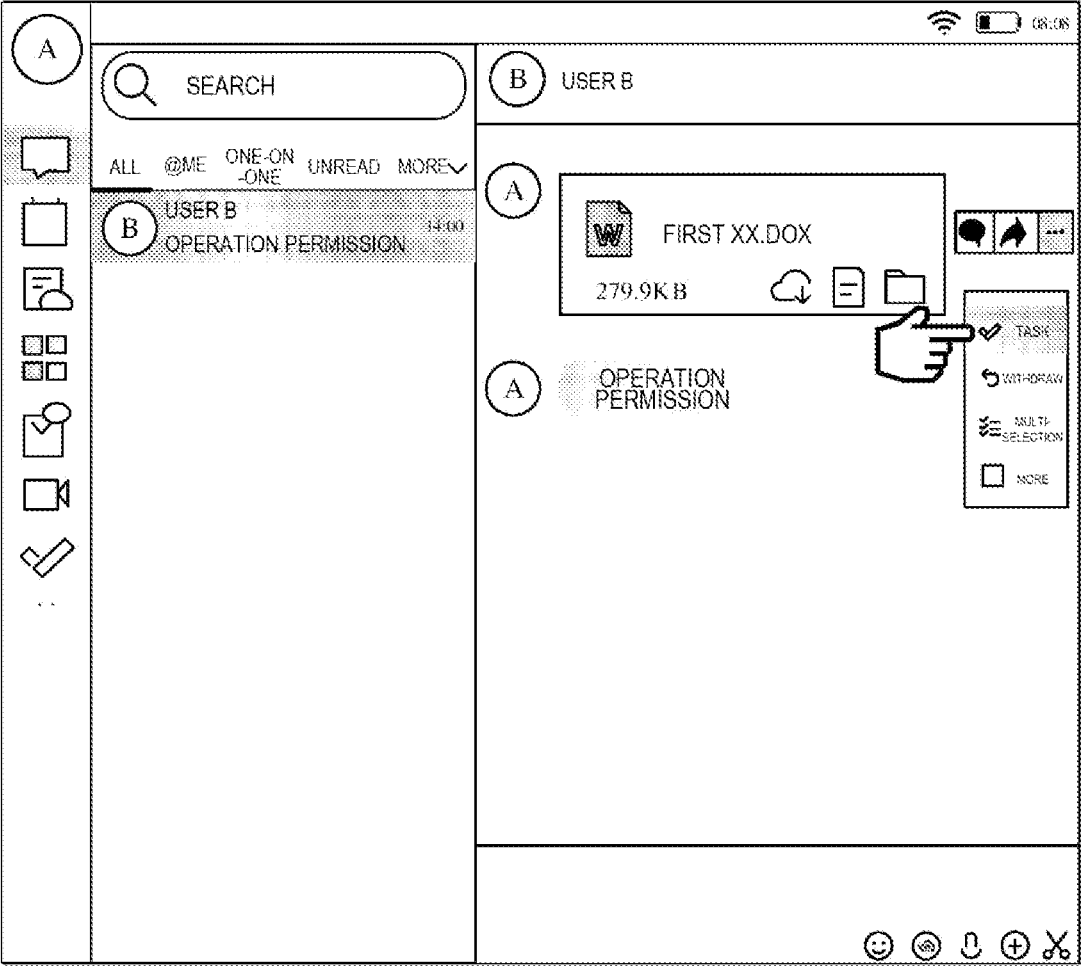
FIG. 2 is a schematic diagram of an interface for task creation provided by the embodiments of the present disclosure.

When the user triggers the triggering operation of creating the first task for the single file message in the session, the first title name of the first task is determined based on the file name of the file corresponding to the single file message. As shown in FIG. 2, the session is for users A and B, and the user A sends a single file message (first XX.dox) to the user B. At this time, the user A triggers the single file message (first XX.dox) to create the first task in the session interface with the user B. At this time, based on the file name of the file corresponding to the single file message, the first title name of the first task is determined. That is, the first title name of the first task is determined to be "first XX.dox".

It should be noted that FIG. 2 exemplarily represents that the user A is in the session interface of the user B, triggering a single file message to create the first task. In other embodiments, when the user A sends a single file message (first XX.dox) to the user B, the user B may also trigger the creation of the first task for the single file message sent by the user A in the session interface with the user A. The present disclosure dose not specifically limit the operation triggered by creating the first task in the session. The session shown in FIG. 2 may be a one-on-one chat session, and in other embodiments, the session may also be a group chat session, which is not limited here.

S20, create the first task and filling the determined first title name in a title region of the first task.

Figures 3, 4:
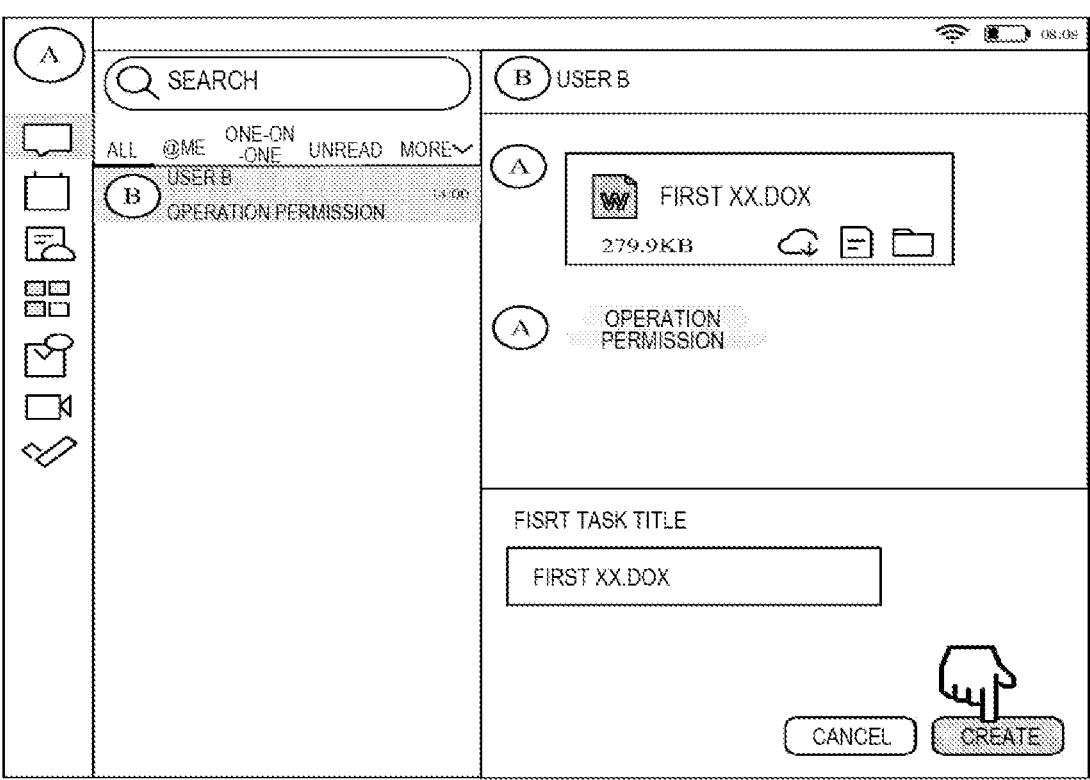
FIG. 3 is a schematic diagram of another interface for task creation provided by the embodiments of the present disclosure.
FIG. 4 is a schematic diagram of further interface for task creation provided by the embodiments of the present disclosure.

After the triggering operation of creating the first task in response to the single file message in the session, as shown in FIG. 3, the first title name of the determined first task is "first XX.dox", and the first task is created by triggering the create button.

FIG. 4 illustrates a schematic diagram of an exemplary interface of the first task created. In FIG. 4, the title name "first XX.dox" is filled in the first title region of the first task created.

It should be noted that the above-described embodiment exemplarily represents the single file message is the file name of the file corresponding to the single file message in the session. In other embodiments, the single file message may be a link name corresponding to a web link, a chat name corresponding to a video chat, etc. The embodiments of the present disclosure do not specifically limit the file type correspond to the single file message.

In addition, after the triggering operation of creating the first task for the single file message in the session, if the title region of the first task created is not filled with the title name, the title region of the first task is filled with the file name of the file corresponding to the single file message. If the title region of the first task created is filled with the title name, there is no need to fill the title region of the first task with the file name of the file corresponding to the single file message.

The method of task creation provided in the embodiments of the present disclosure, in response to a triggering operation of creating a first task for a single file message in a session, determines a first title name of the first task based on a file name of a file corresponding to the single file message; and creates the first task and filling the determined first title name in a title region of the first task. When the user performs the triggering operation of creating the first task for the single file message in the session, based on the file name of the file corresponding to the single file message, the first title name of the first task is determined, and the first title name is filled in the title region of the first task created, so that when the user converts the single file message to the task in the session, the first title region of the first task is filled with the title name, and valid information of the single file message is displayed in the first title region of the first task, reducing the workload of users filling titles.

Then, referring to FIG. 4, when the user performs the triggering operation of creating the first task for the single file message in the session, based on the file name of the file corresponding to the single file message, the first title name of the first task is determined, and the first title name is filled in the title region of the first task created, and the file corresponding to the single message is not added as an attachment to the first task. When the user converts the single file message to the task in the session, the first title region of the first task is filled with the title name, and the file is not added as an attachment.

Figure 5:
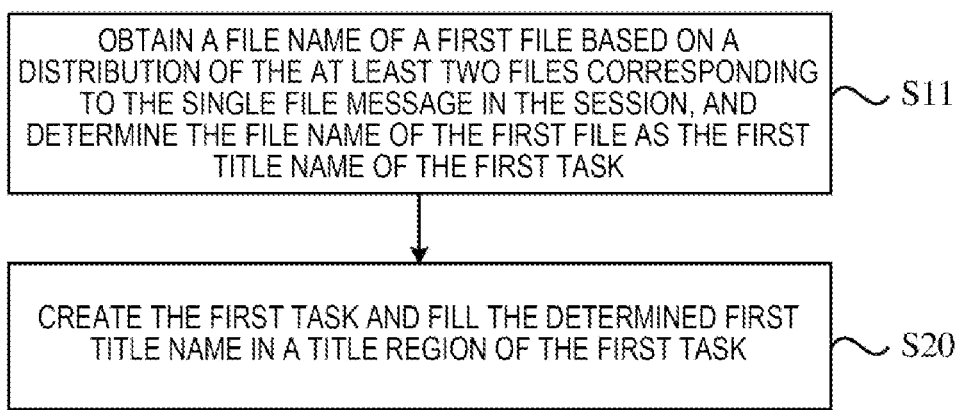
FIG. 5 is a schematic flowchart of another method of task creation provided by the embodiments of the present disclosure.

FIG. 5 is a schematic flowchart of another method of task creation provided by the embodiments of the present disclosure. The embodiment of the present disclosure is based on the above embodiments, exemplary, as shown in FIG. 5, an implementation method of a step S10 includes:

S11, obtain a file name of a first file based on a distribution of the at least two files corresponding to the single file message in the session, and determine the file name of the first file as the first title name of the first task.

Herein, the single file message comprises at least two files.

Figure 6:
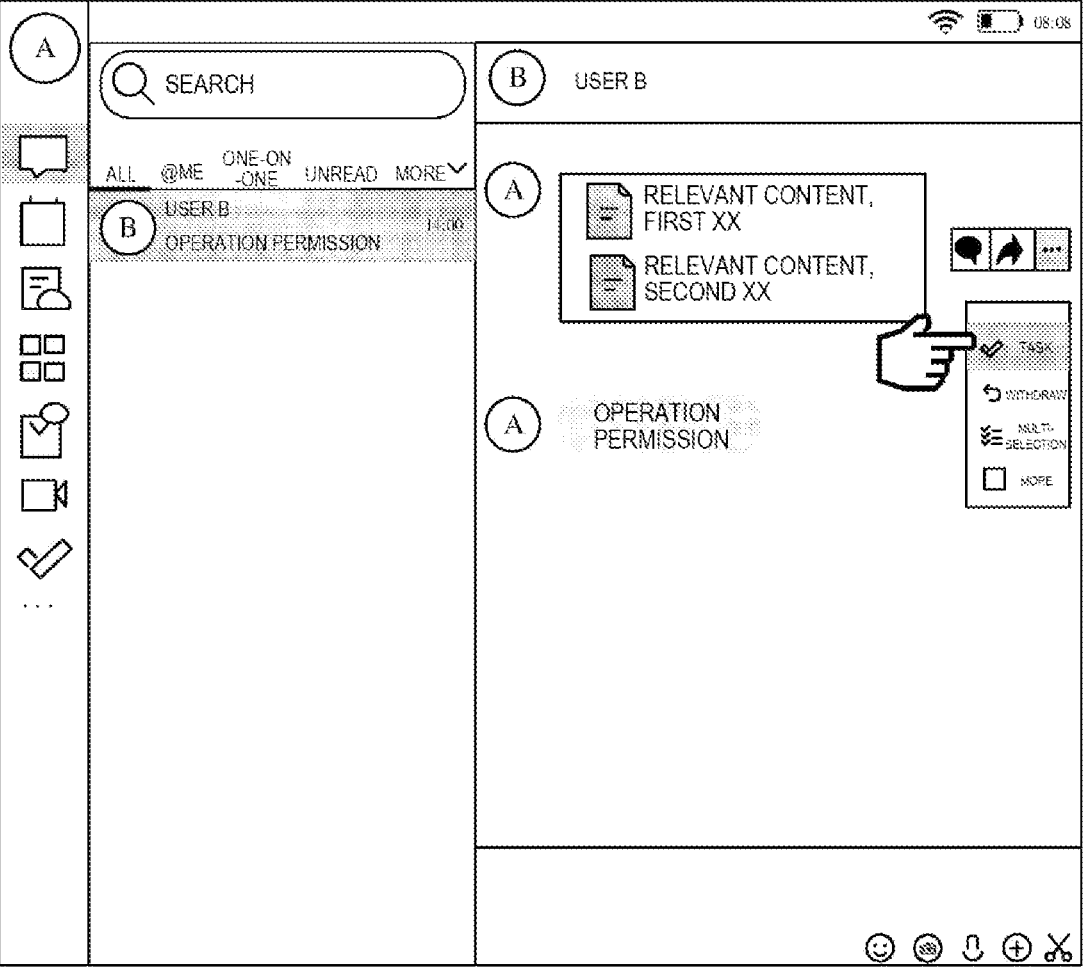
FIG. 6 is a schematic diagram of further interface for task creation provided by the embodiments of the present disclosure.
Figure 7:
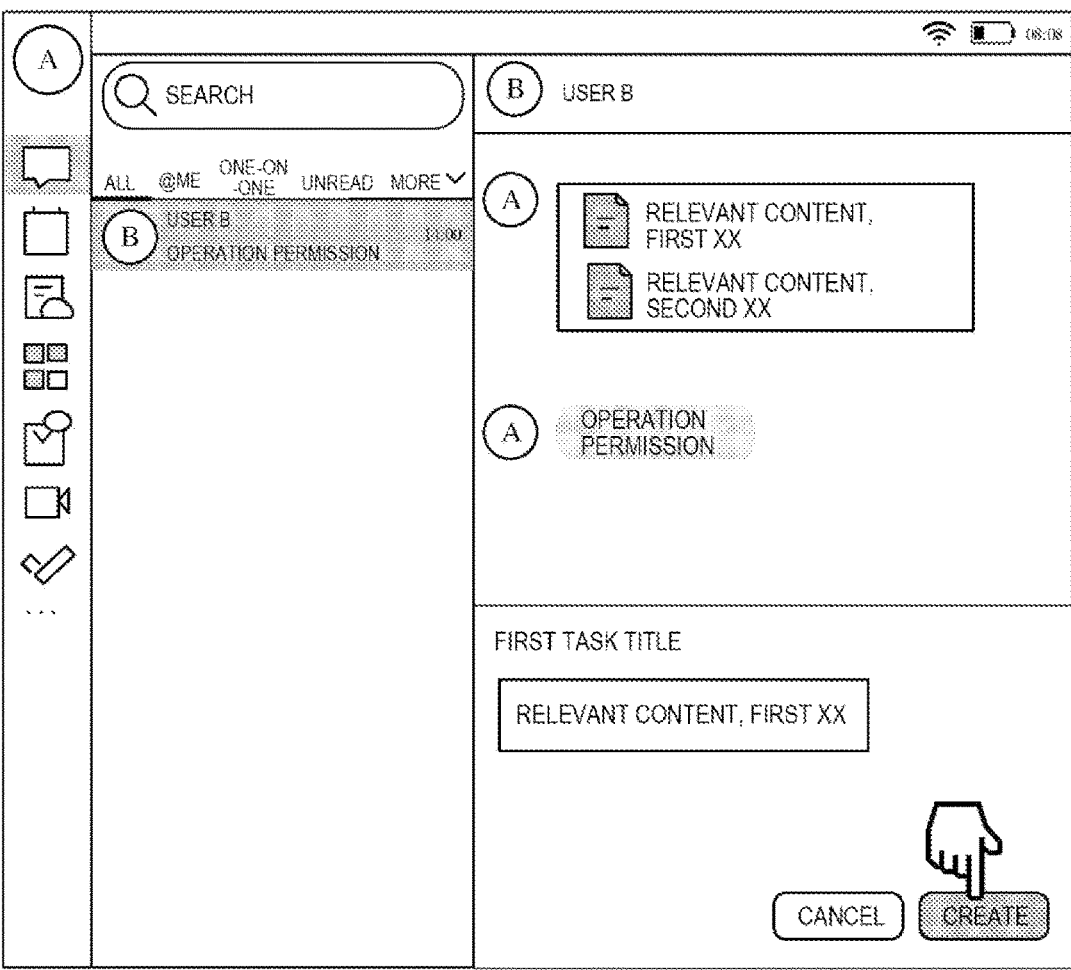
FIG. 7 is a schematic diagram of further interface for task creation provided by the embodiments of the present disclosure.

Specifically, when the user triggers the triggering operation of creating the first task for the single file message in the session, if the single file message corresponds to at least two files, a file name of a first file is obtained based on a distribution of the at least two files corresponding to the single file message in the session, and the file name of the first file is determined as the first title name of the first task. Exemplary, as shown in FIG. 6, the session is between the user A and the user B, and the user A sends the single file message (relevant content, first XX; relevant content, second XX, where relevant content, first XX and relevant content, second XX is file names of files) to the user B. At this time, the user A triggers the single file message (relevant content, first XX; relevant content, second XX) in the session interface with the user B to create the first task. At this time, in response to the triggering operation of creating the first task for the single file message, based on the distribution of the at least two files corresponding to the single file message in the session, the first file name of the file is obtained. The first file name of the first file is the first title name of the first task, that is, the first title name of the first task is determined as "relevant content, first XX", as shown in FIG. 7.

It should be noted that in the above-described embodiment, the scheme of determining the first title name of the first task based on the file name of the file corresponding to the single file message is directed to a message in the session. The message may include a file, may also include two files, or may include a plurality of files, the embodiments of the present disclosure do not specifically limit the number of single file message file.

The method of task creation provided by the embodiments of the present disclosure, when the single file message includes at least two files, in response to the triggering operation of creating the first task for the single file message in the session, obtains a file name of a first file based on a distribution of the at least two files corresponding to the single file message in the session, and determines the file name of the first file as the first title name of the first task, when the user triggers the single file message in the session to create the first task, based on the distribution of the at least two files included in the single file message, the file name of the first file is obtained, the file name of the first file is determined as the first title name of the first task, and the title name is filled in the title region of the first task created, so that when the user converts the single file message to the task in the session and when the single file message corresponds to the at least two files, the title region of the first task is filled with the title name, and valid information of the single file message is displayed in the title region of the first task, reducing the workload of users filling titles.

Figure 8:
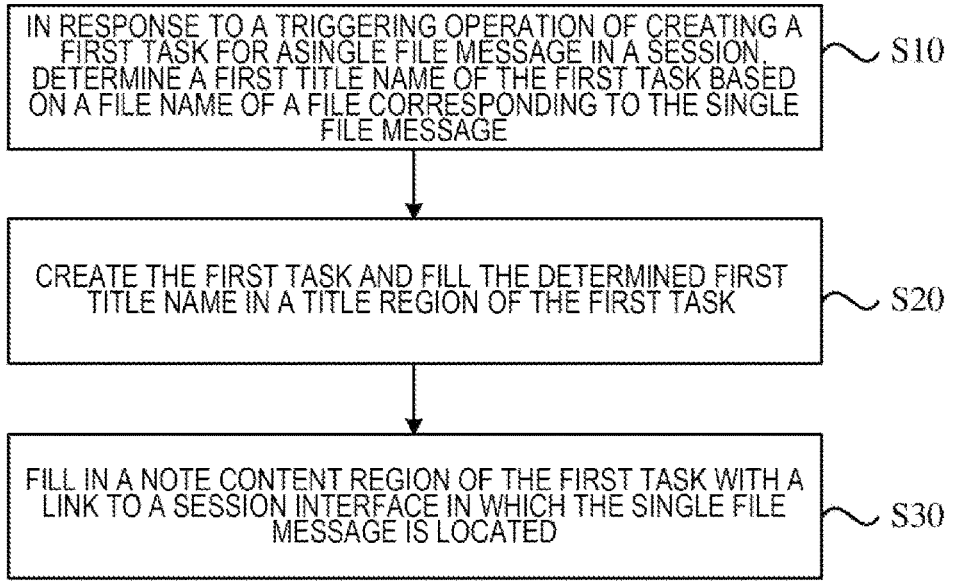
FIG. 8 is a schematic flowchart of further method of task creation provided by the embodiments of the present disclosure.

FIG. 8 is a schematic flowchart of further method of task creation provided by the embodiments of the present disclosure. The embodiment of the present disclosure is based on the embodiments shown in FIG. 1 or FIG. 5. As shown in FIG. 8, the method further comprises:

S30, fill in a note content region of the first task with a link of a session interface in which the single file message is located.

Figures 9, 10:
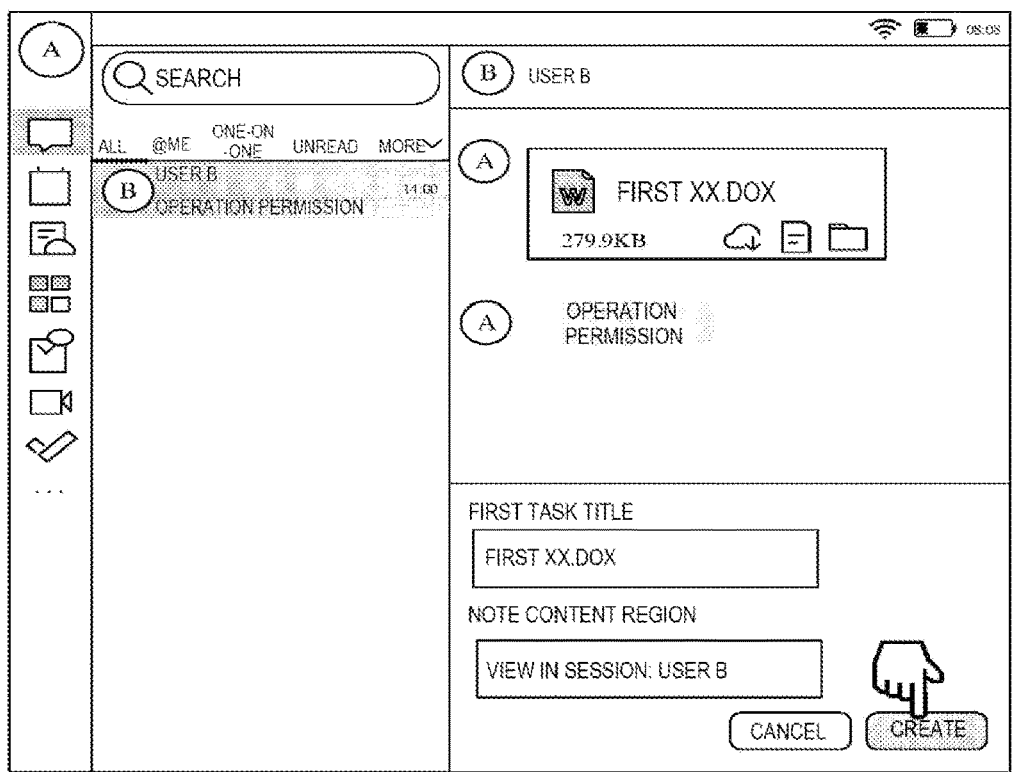
FIG. 9 is a schematic diagram of further interface for task creation provided by the embodiments of the present disclosure.
FIG. 10 is a schematic diagram of further interface for task creation provided by the embodiments of the present disclosure.

Specifically, when the user triggers the triggering operation of creating the first task for the single file message in the session, the content of the note content region of the first task is determined. As shown in FIG. 9, the session is between the user A and the user B. The user A sends a single file message (first XX.dox) to the user B. At this time, the content of the note content region of the first task is determined to be "View in session: user B". After the first task is created, a link is filled in the note content region of the first task to the session interface where the single file message is located. For example, as shown in FIG. 10, the first task created is that the user A sends the single file message to the user B in the session interface with the user B, and the user A triggers the single file message (first XX.dox) to create the first task. At this time, the link in the session interface where the single file message is located is filled in the note content region of the first task. The link shown in FIG. 9 is "View in session: user B".

In another implementation, the first task created is that the user B receives the single file message sent by the user A in the session interface between the user B and the user A, and the user B triggers the creation of the first task corresponding to the single file message (first XX.dox) sent by the user A. At this time, the link in the session interface where the single file message is located is filled in the note content region of the first task, which is exemplarily "View in session: user A".

The method of task creation provided by the embodiments of the present disclosure, after creating the first task and filling the title name in the title region of the first task, does not use the file corresponding to the file message as an attachment alone, but fills in the note content region of the first task with the link of the session interface in which the single file message is located. The user may view the file corresponding to the file message by triggering the link of the session interface, which may facilitate the user to determine context information of the single file message.

FIG. 11 is a schematic diagram of further interface for task creation provided by the embodiments of the present disclosure. The embodiment of the present disclosure is based on the above embodiments. As shown in FIG. 11, the method further comprises:

540, in response to a triggering operation for the link of the session interface in which the single file message is located in the note content region of the first task, display the session interface which comprising the single file message.

Specifically, after filling the link of the session interface where the single file message is located in the note content region of the first task, the session interface is displayed by triggering the link of the session interface where the single file message is located in the note content region of the first task. Exemplarily, in conjunction with FIGS. 10 and 12, after triggering the link of the session interface where the single file message is located in the note content region of the first task in FIG. 10, the session interface shown in FIG. 12 is displayed, and the session interface includes the aforementioned single file message.

In FIG. 12, in the displayed session interface, the single file message is displayed with an identification, which facilitates the user to determine a specific position of the first task in the session, and then facilitates the user to confirm the previous and subsequent session messages associated with the first task. Here, the single file message is displayed with the identification, which means that the single message is highlighted differently from other messages. As shown in FIG. 12, a background color of the single message is different from other messages.

It should be noted that the embodiments of the present disclosure do not specifically limit the display mode of the session interface. In FIG. 12, an exemplary representation shows that a single file message corresponding to the first task is displayed at the center position of the session interface. In other implementations, a single file message may also be displayed at the first message position of the session interface, or a single file message may be displayed at the last message position of the session interface.

The method of task creation provided by the embodiments of the present disclosure, after creating a first task and filling the title name in the title region of the first task, filling the link of the session interface where the single file message is located in the note content region of the first task, in response to triggering the link of the session interface where the single file message in the note content region of the first task is located, displays the session interface, and the session interface includes the single file message, which facilitates the user to determine the specific position of the first task in the session, and then facilitates the user to confirm the previous and subsequent session messages associated with the first task.

Figure 13:
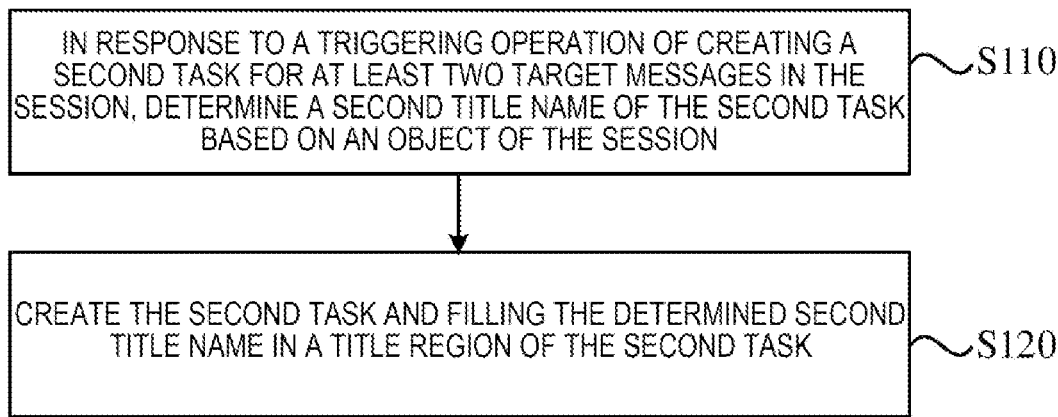
FIG. 13 is a schematic flowchart of further method of task creation provided by the embodiments of the present disclosure.

FIG. 13 is a schematic flowchart of further method of task creation provided by the embodiments of the present disclosure. The embodiment of the present disclosure is based on the above embodiments. As shown in FIG. 13, the method comprises:

S110, in response to a triggering operation of creating a second task for at least two target messages in the session, determine a second title name of the second task based on an object of the session.

Herein, the at least two target messages include at least one file message.

Figure 14:
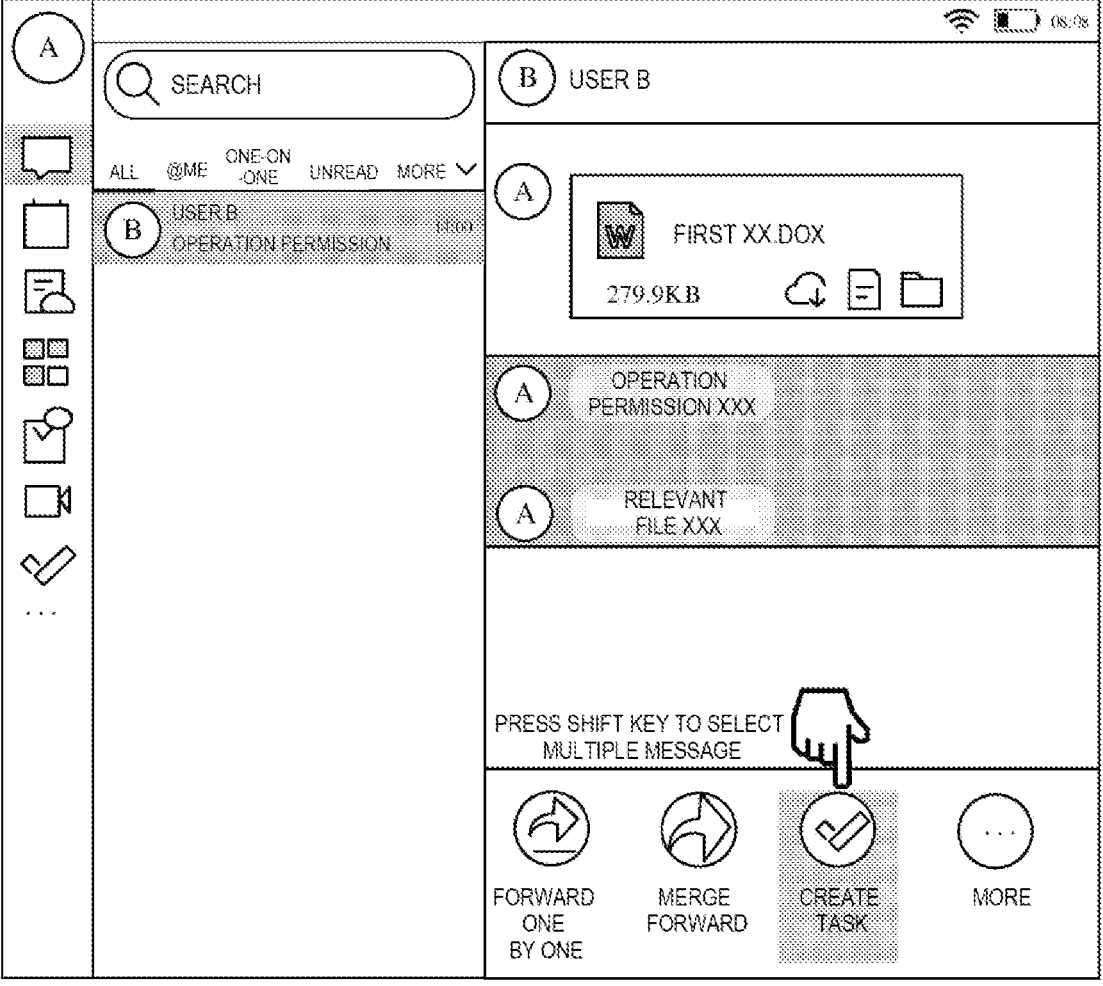
FIG. 14 is a schematic diagram of further interface for task creation provided by the embodiments of the present disclosure.

After the triggering operation the user triggers the at least two target messages to create a second task in the session, the second title name of the second task is determined based on the session object. Exemplarily, as shown in FIG. 14, the session is between the user A and the user B, and the user A sends at least two target messages (operation permission XXX, relevant file XXX) to the user B. At this time, the user A triggers the creation of the second task corresponding to the target message (operation permission XXX, relevant file XXX) in the session interface with the user B. At this time, in response to triggering the second task of the creation of the target message, and the title name of the second task is determined based on the object of the session, that is, the title name of the second task is determined to be "from session: user B".

It should be noted that FIG. 14 exemplarily shows that the user A triggers the at least two target messages to create a second task in the session interface with the user B. In other implementations, after the user A sends the target message (operation permission XXX, relevant file XXX) to the user B, the user B may also trigger the creation of the second task for the at least two target messages sent by the user A in the session interface with the user A. After the user B may also trigger the creation of the second task for the at least two target messages sent by the user A in the session interface with the user A, based on the object of the session, the title name of the second task is determined, that is, the title name of the second task is determined to be "from session: user A". The present disclosure does not specifically limit the operation triggered by creating the second task in the session.

Specifically, the at least two target messages may include: a chat message in the session and/or a file message in the session.

In the above embodiments, the at least two target messages are chat messages in the session. In other embodiments, the at least two target messages include at least one file message. Exemplarily, in the two target messages, one is a chat message, the other is a file message. In addition, at least two target messages are file messages. The embodiments of the present disclosure do not define the specific type of the at least two target messages.

Further, the scheme provided in the embodiments of the present disclosure, based on the at least two target messages in the session, determines the second title name of the second task.

S120, create the second task and filling the determined second title name in a title region of the second task.

Figure 15:
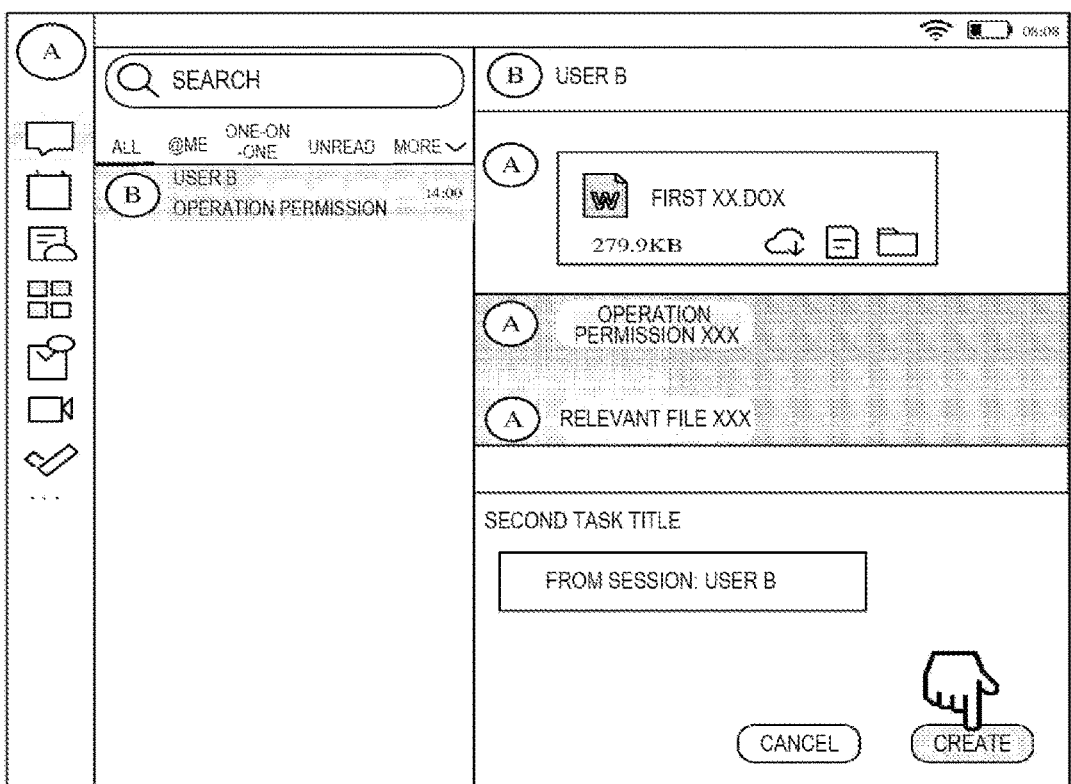
FIG. 15 is a schematic diagram of further interface for task creation provided by the embodiments of the present disclosure.

After the triggering operation that the second task is created for at least two target messages in the session, as shown in FIG. 15, the second title name of the determined second task is "from session: user B", and the second task is created by triggering the create button.

FIG. 15 exemplarily represents a schematic diagram of the interface of the created second task. In FIG. 15, the title name "from session: user B" is filled in the second title region of the created second task.

Figure 16:
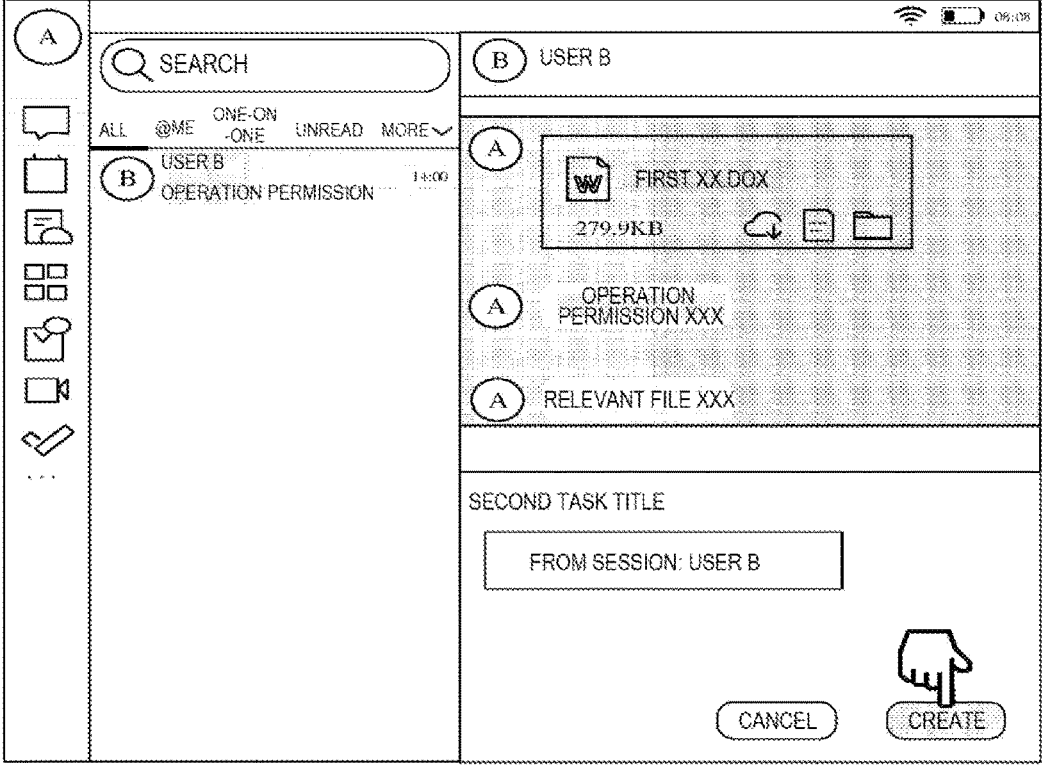
FIG. 16 is a schematic diagram of further interface for task creation provided by the embodiments of the present disclosure.

It should be noted that FIG. 15 exemplarily represents at least two target messages as chat messages in the session. In other implementations, when the target message includes both chat messages and files in the session, based on the object of the session, the second title name of the second task is determined to be "from session: user B", that is, the files in the at least two target messages do not fill in the second title region of the second task corresponding to the target message. Exemplarily, as shown in FIG. 16, the user A triggers the creation of the second task corresponding to the target message (first XX.dox, operation permission XXX, and relevant file XXX) in the session interface with the user B. At this time, in response to triggering the creation of the second task of the target message, based on the object of the session, the second title name of the second task is determined, that is, the second title name of the second task is determined to be "from session: user B".

The method of task creation provided in the embodiments of the present disclosure, in response to triggering the creation of the second task for at least two target messages in the session, determines the title name of the second task based on the object of the session, creates the second task, and fills the title name in the title region of the second task. When the user triggers the creation of the second task for the at least two target messages in the session, based on the object corresponding to the at least two target messages, the title name of the second task is determined, and the title name is filled in the title region of the created second task. When the user converts the at least two target messages to the task in the session of the application, the title name is filled in the title region of the second task, and the valid information of the at least two target messages is displayed in the title region of the second task, reducing the workload of the user filling the title.

FIG. 17 is a schematic flowchart of further method of task creation provided by the embodiments of the present disclosure. The embodiment of the present disclosure is based on the embodiments corresponding to FIG. 13. As shown in FIG. 17, the method comprises:

S130, fill in a note content region of the second task with a link to a session corresponding to the at least two target messages which comprising the at least two target messages.

Specifically, as shown in FIG. 18, after the second task is created, the link of the session corresponding to the at least two target messages is filled in the note content region of the second task. Exemplarily, the created second task is that the user A sends two target messages (operation permission XXX, relevant file XXX) to the user B in the session interface with the user B. The user A triggers the creation of the second task corresponding to the two target messages (operation permission XXX, relevant file XXX) to achieve the creation of the second task. At this time, the link of the session corresponding to the at least target message is filled in the note content region of the second task. The link of the session is exemplarily shown in FIG. 18:

"session record of user A and user B user A: operation permission XXX user A: Relevant file XXX".

Figure 19:
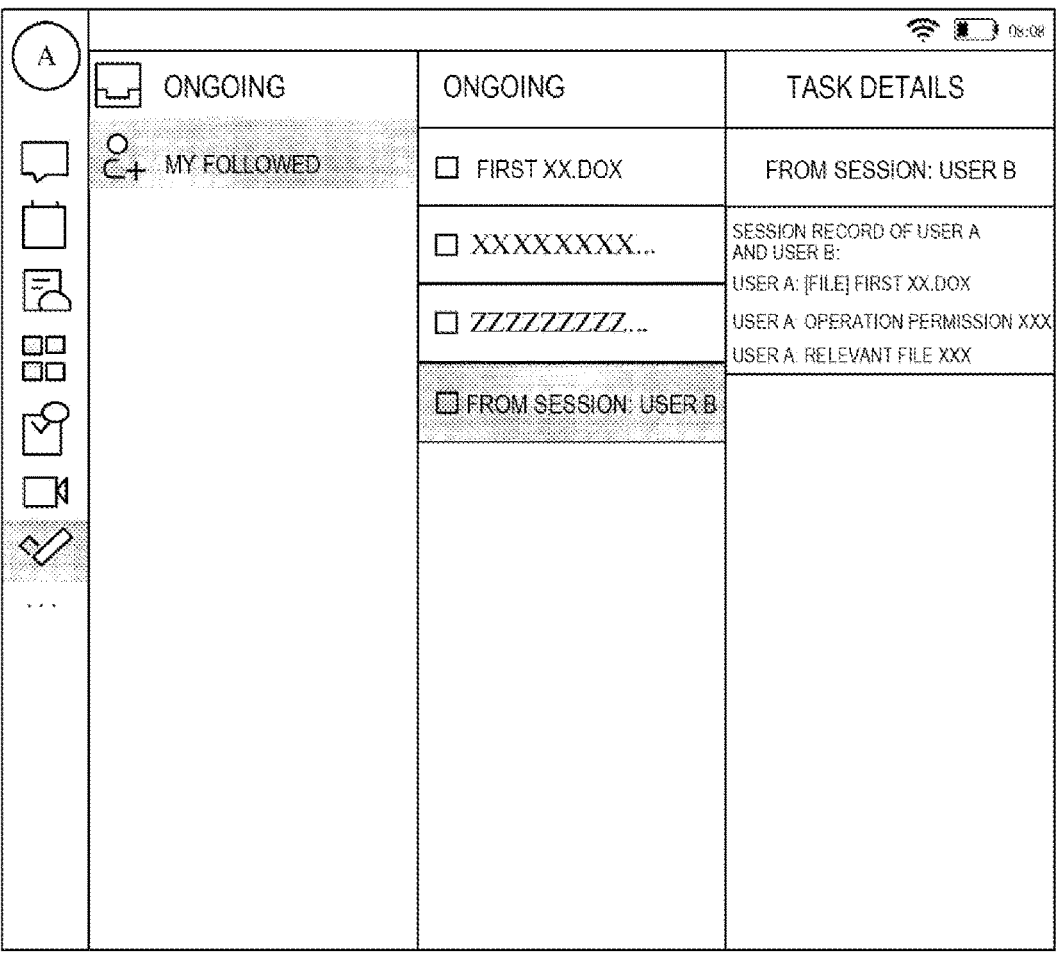
FIG. 19 is a schematic diagram of further interface for task creation provided by the embodiments of the present disclosure.

It should be noted that FIG. 18 exemplarily represents the at least two target messages as chat messages in the session. In other implementations, when the at least two target messages include both chat messages in the session and files, the link of the session corresponding to the two target messages is filled in the note content region of the second task. The file included in the target message does not fill the title region of the second task. The file included in the target message is retained in the link of the corresponding session, as shown in FIG. 19.

"session record of user A and user B user A: [file] first XX.dox user A: operation permission XXX user A: relevant file XXX".

In another implementation, the created second task is that the user B receives two target messages (operation permission XXX and relevant file XXX) sent by the user A in the session interface with the user A, and the user B triggers the creation of the second task corresponding to the two target messages (operation permission XXX and relevant file XXX) sent by the user A to realize the creation of the second task. At this time, the link of the sessions corresponding to the two target messages is filled in the note content region of the second task.

"session record of user B and user A user A: document permission XXX user A: relevant file XXX".

The method of task creation provided by the embodiments of the present disclosure, after creating a second task and filling the title name in the title region of the second task, fills in the note content region of the second task with the link of the session corresponding to the at least two target messages session, to facilitate the user to determine the context information of the target message.

Figure 20:
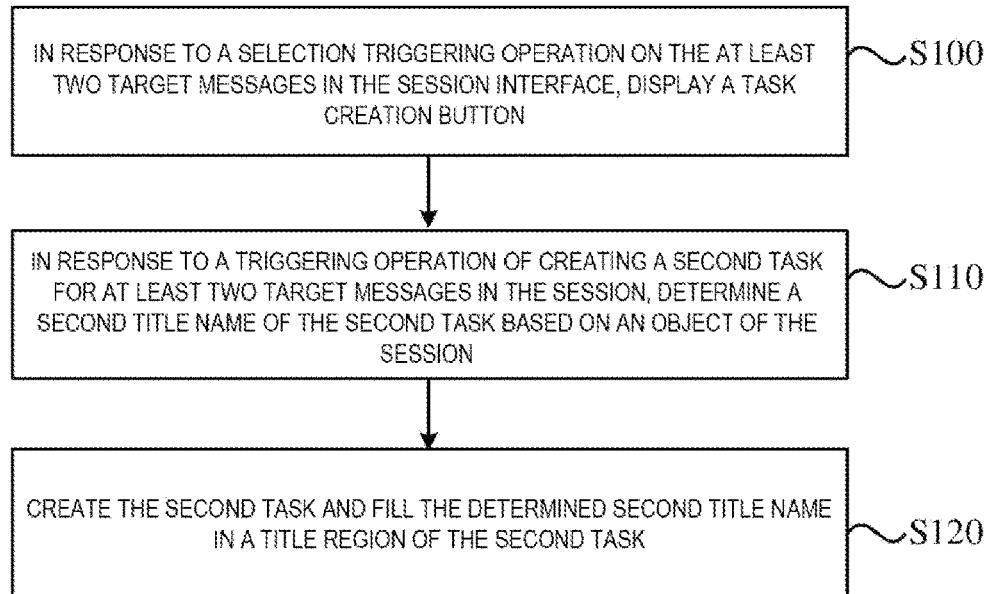
FIG. 20 is a schematic flowchart of further method of task creation provided by the embodiments of the present disclosure.

FIG. 20 is a schematic flowchart of further method of task creation provided by the embodiments of the present disclosure. The embodiment of the present disclosure is based on the embodiments corresponding to FIG. 13 or FIG. 17. As shown in FIG. 20, before step S110 the method further comprises:

S100, in response to a selection triggering operation on the at least two target messages in the session interface, display a task creation button.

Figure 21:
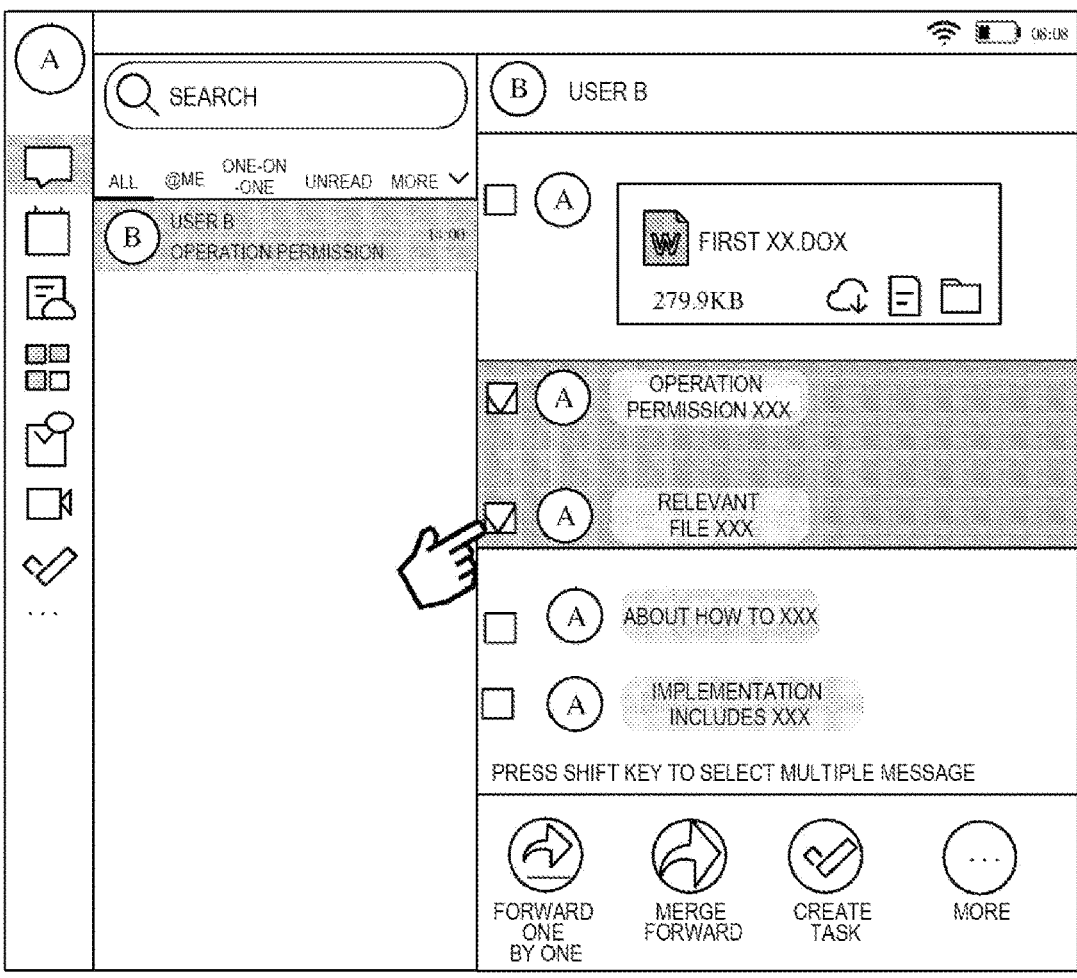
FIG. 21 is a schematic diagram of further interface for task creation provided by the embodiments of the present disclosure.
Figure 22:
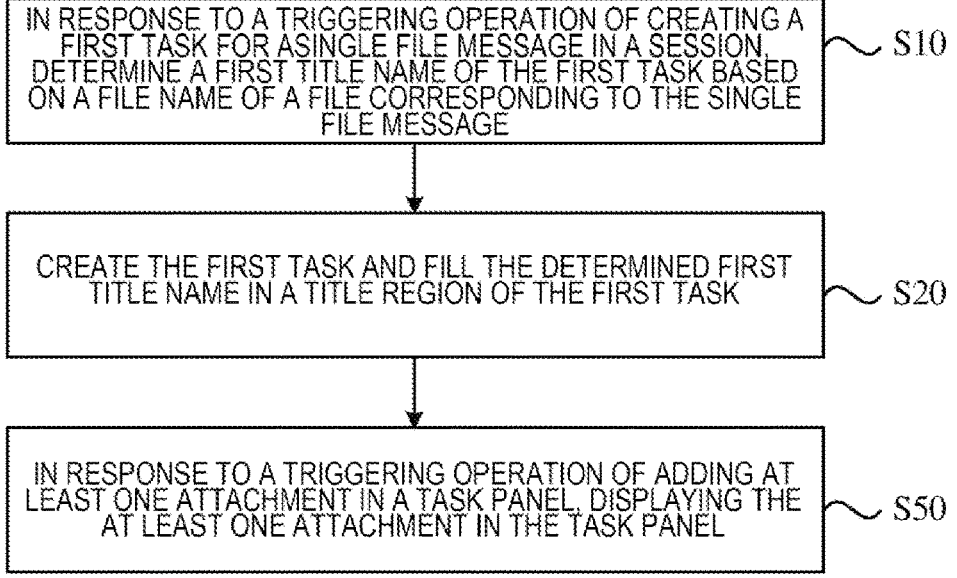
FIG. 22 is a schematic flowchart of further method of task creation provided by the embodiments of the present disclosure.

Specifically, as shown in FIG. 21, the session is between the user A and the user B, and the target message sent by the user A to the user B includes (operation permission XXX, relevant file XXX, about how to XXX, implementation includes XXX). At this time, the user A selects the target message (operation permission XXX) and target message (relevant file XXX) in the session interface with the user B and triggers them. At this time, the task creation button is displayed.

It should be noted that in the embodiments of the present disclosure, the mode of selecting the at least two target messages in the session interface may be to long-press the target message to display the operation bar, select a multi-select button in the operation bar, and select the at least two target messages. In other implementations, the target message may also be selected by clicking, selecting the multi-select button in the operation bar corresponding to the target message, and selecting the at least two target messages. The embodiments of the present disclosure do not limit the specific operation process triggered by the selection of the at least two target messages in the session interface.

In addition, after triggering the selection of the at least two target messages in the session interface, a position of the displayed task creation button may be set at the bottom of the session interface or on the right side of the session interface. The embodiments of the present disclosure do not limit the specific position of the task creation button, and do not specifically limit a size, shape, color, etc. of the task creation button.

The embodiments of the present disclosure further provide a method of task creation. The method of task creation may be implemented in combination with any of the above embodiments or may be implemented independently. The method comprises:

S50, in response to a triggering operation of adding at least one attachment in a task panel, displaying the at least one attachment in the task panel.

Specifically, the mode of adding at least one attachment may be achieved by dragging and dropping the at least one attachment in the task panel, or by right-clicking or long-pressing a blank region in the task panel to add the at least one attachment in the task panel, or by triggering an add button to add the at least one attachment in the task panel. The embodiments of the present disclosure do not specifically limit the implementation of adding at least one attachment in the task panel.

The task panel may be a task panel created when the session is converted to task, or a task panel corresponding to the created task, or a task panel corresponding to the newly created task.

Figure 23A:
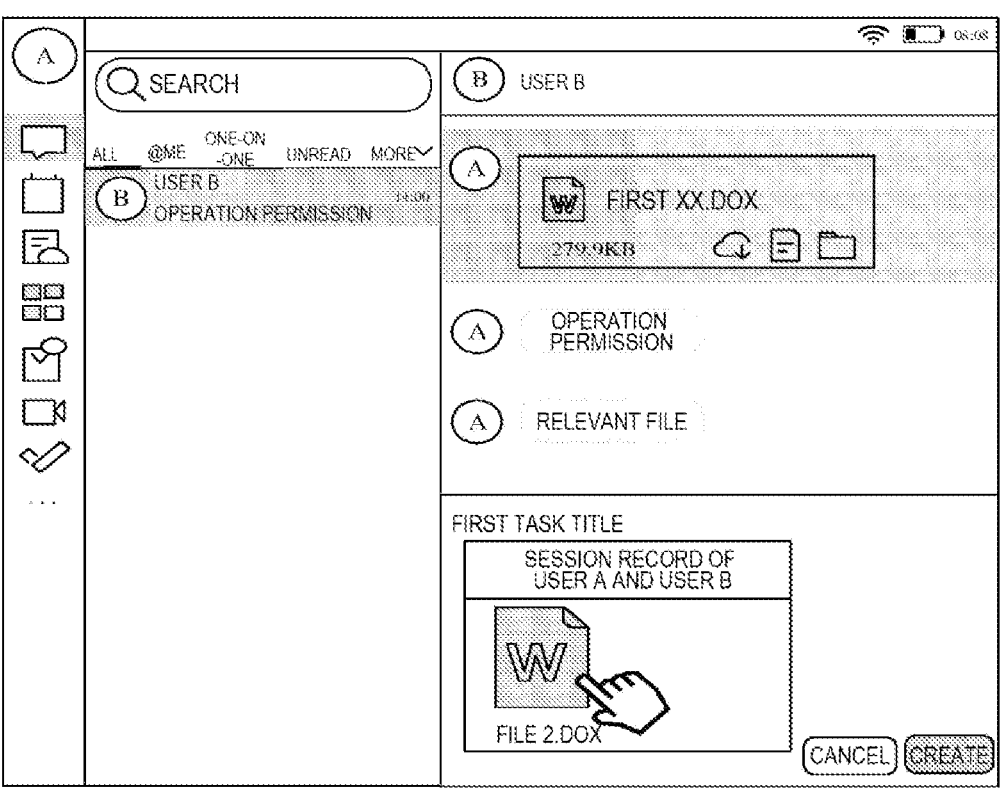
FIG. 23A is a schematic diagram of further interface for task creation provided by the embodiments of the present disclosure.
Figure 23B:
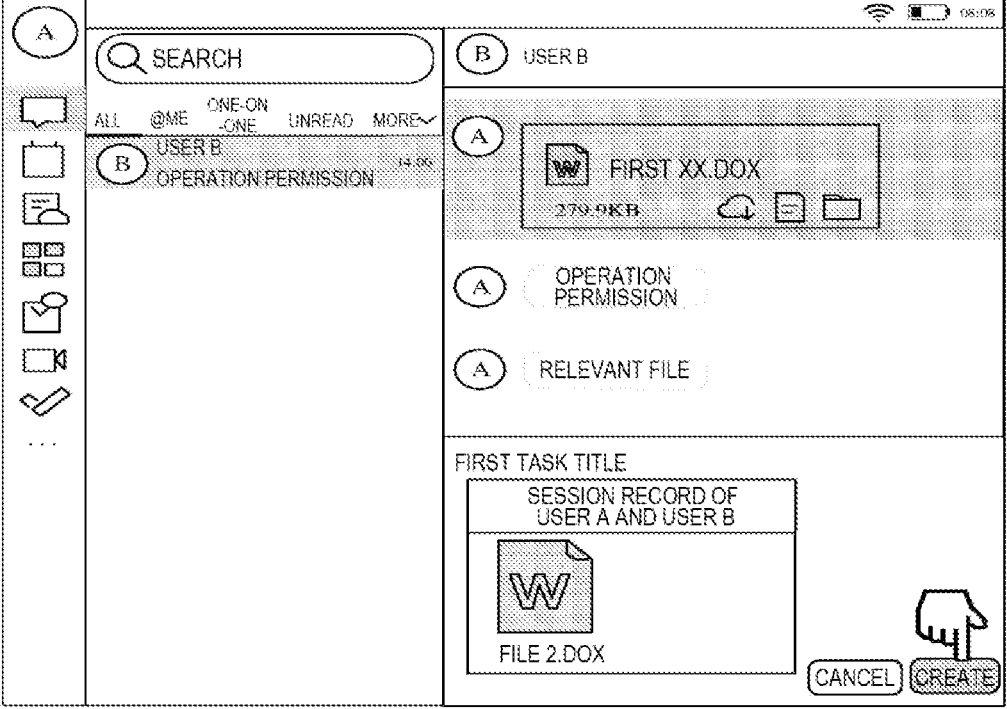
FIG. 23B is a schematic diagram of further interface for task creation provided by the embodiments of the present disclosure.

Exemplary, in response to a triggering operation of adding at least one attachment in a task panel, displaying the at least one attachment in the task panel may be based on the foregoing embodiments, and may be performed before creating the first task or create the second task. For example, in FIG. 23A, the attachment may be added to the task panel displayed in the session to task process. After adding the attachment, click the create button to create the task, as shown in FIG. 23B.

Figures 24A, 24B:
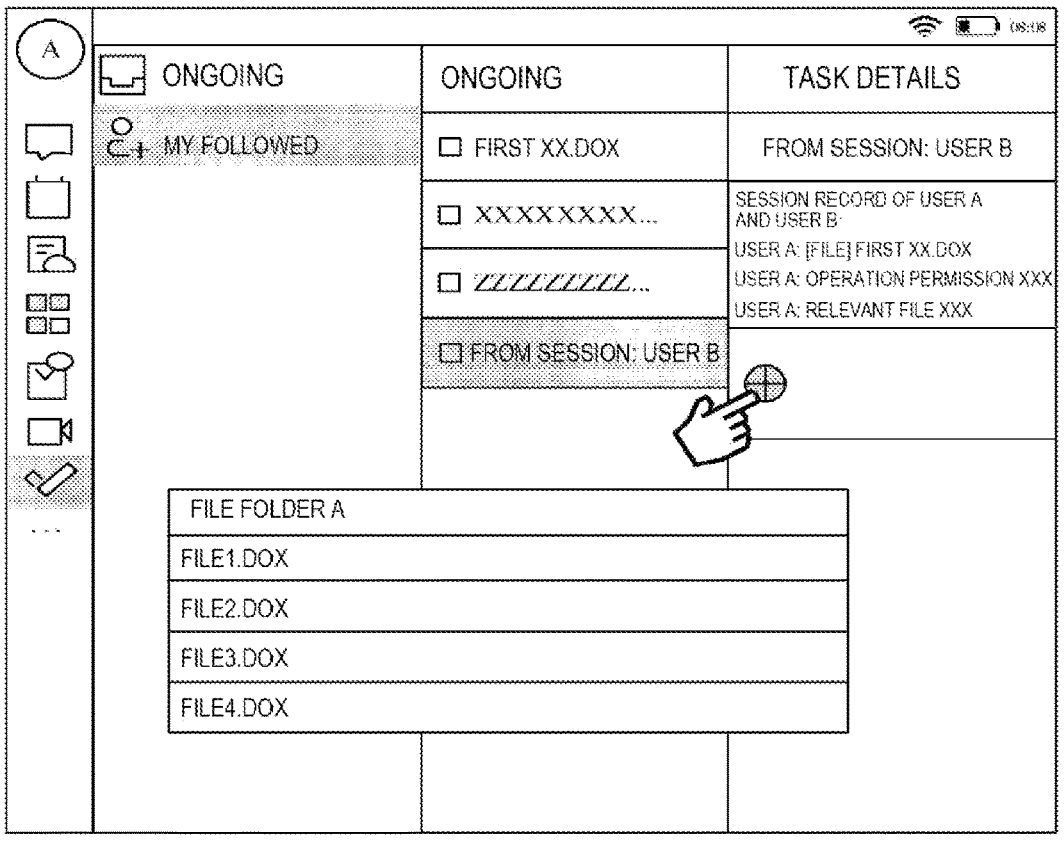
FIG. 24A is a schematic diagram of further interface for task creation provided by the embodiments of the present disclosure.
FIG. 24B is a schematic diagram of further interface for task creation provided by the embodiments of the present disclosure.

Exemplarily, the embodiments of the present disclosure provide an interface schematic diagram for adding attachment to the task panel by triggering the add button in the task panel created when the session is converted to the task. As shown in FIG. 24A, the task "from session: user B" is created when the task is converted in the session. When the user triggers the add button in the task panel corresponding to the task "from session: user B", a file folder of the attachment may be added and displayed on the task panel. By selecting the corresponding attachment in the file folder, the at least one attachment may be displayed in the task panel, as shown in FIG. 24B.

Figures 25, 26:
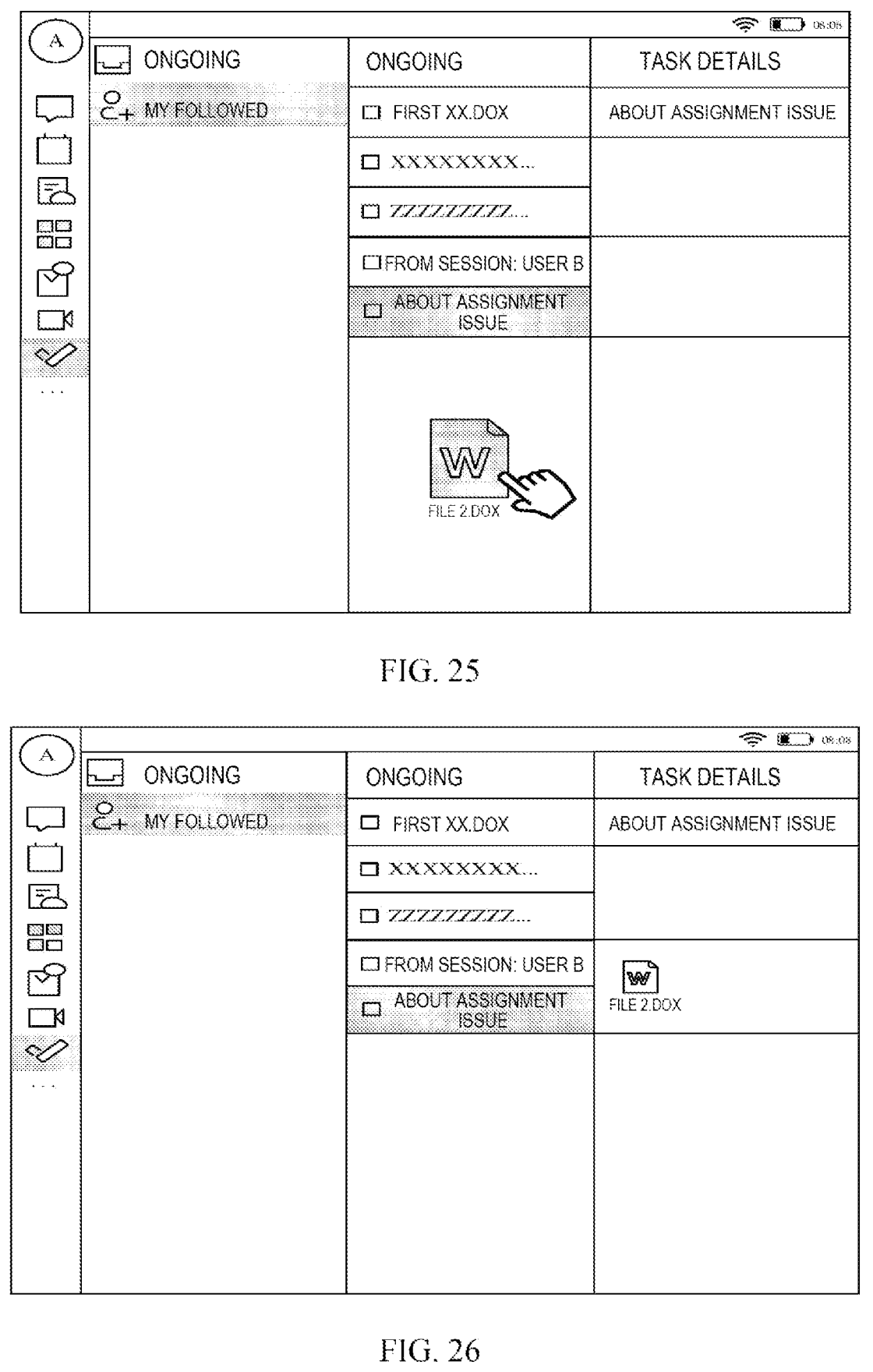

FIG. 25 is a schematic diagram of the interface for adding attachments to the task panel by dragging and dropping in the task panel corresponding to the created task provided in the embodiments of the present disclosure. As shown in FIG. 24B, the task "about assignment issue" is a task created by the user. When the user drags and drops the attachment in the task panel corresponding to the task "about assignment issue", at least one attachment is displayed in the task panel, as shown in FIG. 26.

Figures 27, 28:
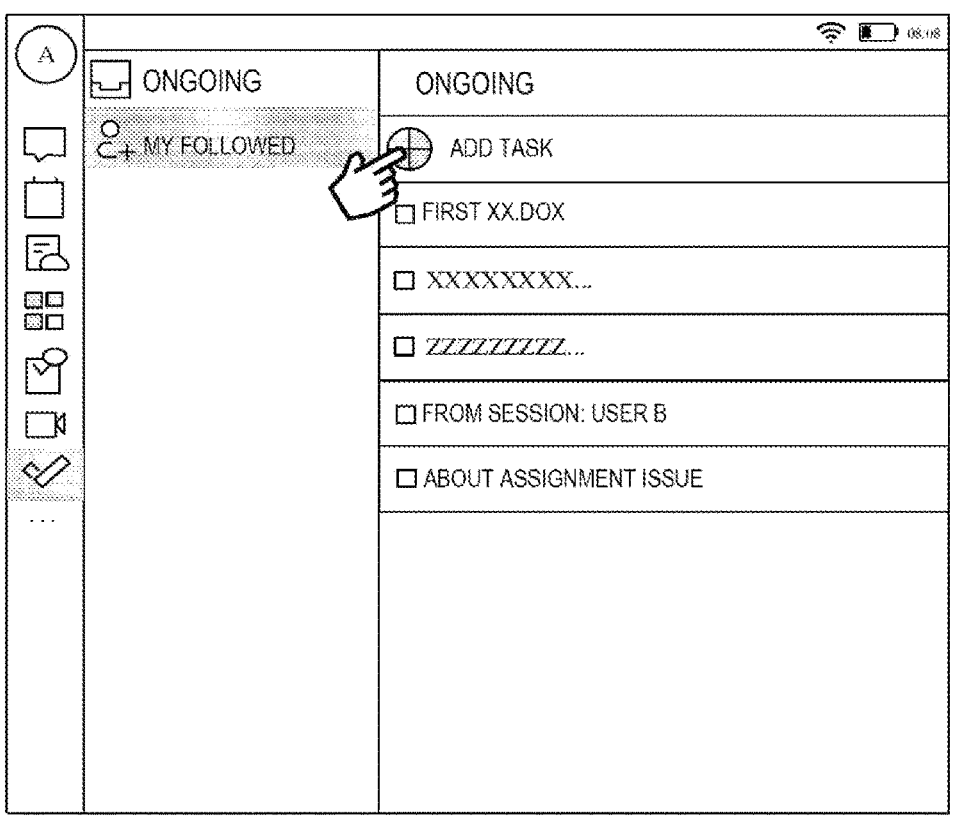
FIG. 27 is a schematic diagram of further interface for task creation provided by the embodiments of the present disclosure.
FIG. 28 is a schematic diagram of further interface for task creation provided by the embodiments of the present disclosure.
Figures 29, 30:
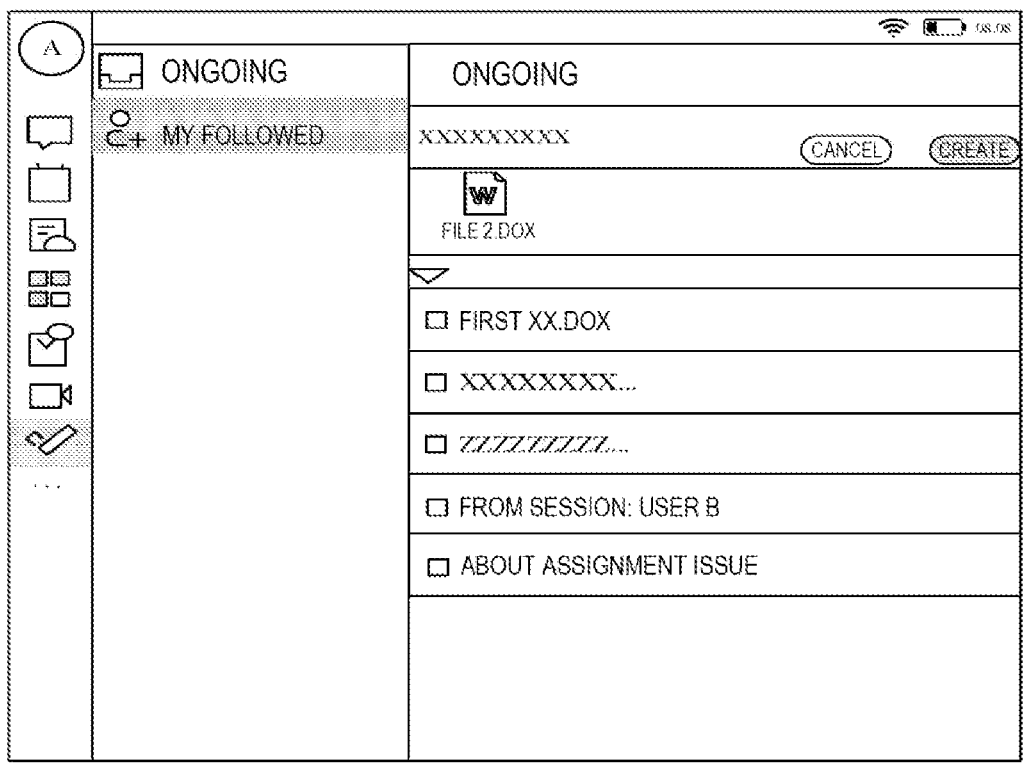
FIG. 29 is a schematic diagram of further interface for task creation provided by the embodiments of the present disclosure.
FIG. 30 is a schematic diagram of further interface for task creation provided by the embodiments of the present disclosure.

FIG. 27 is a schematic diagram of an interface for adding attachments to the task panel by right-clicking or long-pressing a blank region in the task panel corresponding to the newly created task provided by the embodiments of the present disclosure. As shown in FIG. 27, when the user triggers the creation of a task, the task panel corresponding to the newly created task interface is shown in FIG. 28. After the user long-presses the blank region in the task panel corresponding to the newly created task, the button to add attachments is displayed. When the user triggers the button to add attachments in the task panel, at least one attachment is displayed in the task panel, as shown in FIG. 29.

It should be noted that when adding an attachment in the task panel corresponding to the newly created task, if the title region of the task panel corresponding to the newly created task is empty, the file name of the first attachment in at least one attachment will be filled into the title region. If the title region of the task panel corresponding to the newly created task is not empty, when the user triggers the add at least one attachment operation in the task panel, at least one attachment will be displayed in the task panel without filling the file name of the first attachment in the title region. For example, in FIG. 29, the title region of the task panel corresponding to the newly created task is filled with "XXXXXXX", that is, the title region of the task panel corresponding to the newly created task is not empty. When adding at least one attachment in the task panel by dragging, right-clicking, or long-pressing the blank region in the task panel and triggering the add button, only the added at least one attachment is displayed in the task panel corresponding to the newly created task. In FIG. 30, the title region of the task panel corresponding to the newly created task is empty. After adding at least one attachment in the task panel by dragging and dropping, right-clicking, or long-pressing the blank region in the task panel, and triggering the add button, the file name of the first attachment in at least one attachment is filled in the title region. That is, the file name of the first attachment ([file] file 2.dox) is filled in the title region.

Figure 31:
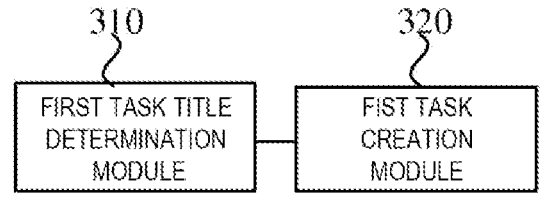
FIG. 31 is a schematic diagram of an apparatus for task creation provided by the embodiments of the present disclosure.

Based on the above embodiments, the embodiments of the present disclosure further provide an apparatus for task creation. As shown in FIG. 31, the apparatus for task creation comprises:

a first task title determination module configured to in response to a triggering operation of creating a first task for a single file message in a session, determine a first title name of the first task based on a file name of a file corresponding to the single file message; and a first task creation module configured to create the first task and filling the determined first title name in a title region of the first task.

In the apparatus for task creation provided by the embodiments of the present disclosure, the first task title determination module responds to a triggering operation of creating a first task for a single file message in a session, the first task creation module determines a title name of the first task based on a file name of a file included in the single file message, creates a first task, and fills the first title name in a title region of the first task. When the user performs the triggering operation of creating the first task for the single file message in the session, based on the file name of the file corresponding to the single file message, the first title name of the first task is determined, and the first title name is filled in the title region of the first task created, so that when the user converts the single file message to the task in the session, the first title region of the first task is filled with the title name, and valid information of the single file message is displayed in the first title region of the first task, reducing the workload of users filling titles.

Optionally, the apparatus further comprises:

a first task title determination unit for obtaining a file name of a first file based on a distribution of the at least two files corresponding to the single file message in the session, and determining the file name of the first file as the first title name of the first task, the single file message corresponding to at least two files.

Optionally, the apparatus further comprises:

a first task content filling module for filling in a note content region of the first task with a link of a session interface in which the single file message is located.

Optionally, the apparatus further comprises:

a display module for in response to a triggering operation for the link of the session interface in which the single file message is located in the note content region of the first task, displaying the session interface which comprising the single file message.

Optionally, the apparatus further comprises:

a second task title determination means for in response to a triggering operation of creating a second task for at least two target messages in the session, determining a second title name of the second task based on an object of the session; wherein the at least two target messages comprise at least one file message; and a second task creation module for creating the second task and filling the determined second title name in a title region of the second task.

Optionally, the apparatus further comprises:

a second task content filling module for filling in a note content region of the second task with a link of a session corresponding to the at least two target messages which comprising the at least two target messages.

Optionally, the apparatus further comprises:

a task creation button display module for in response to a selection triggering operation on the at least two target messages in the session interface, displaying a task creation button.

Optionally, the apparatus further comprises:

an attachment display module for in response to a triggering operation of adding at least one attachment in a task panel, displaying the at least one attachment in the task panel.

Optionally, the apparatus further comprises:

a title region file name determination module for if a title region of the task panel is empty, filling in the title region based on a file name of the at least one attachment. It is noted that in the embodiment of the above apparatus, the various units and modules included are only divided according to functional logic, but are not limited to the above division, as long as the corresponding functions can be realized; in addition, the specific names of each functional unit are only for the convenience of mutual distinction and are not used to limit the scope of the present invention.

The apparatus provided in the embodiments of the present invention may perform the method provided by any embodiment of the present invention, and has corresponding functional modules and beneficial effects for performing the method.

Figure 32:
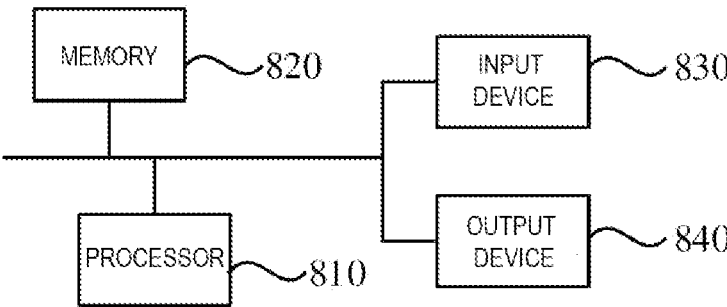
FIG. 32 is a schematic diagram of an electronic device provided by the embodiments of the present disclosure.

FIG. 32 is a schematic diagram of an electronic device provided by the embodiments of the present disclosure. As shown in FIG. 32, the electronic device includes a processor 810, a memory 820, an input device 830 and an output device 840; the number of processors 810 in the electronic device may be one or more. In FIG. 32, one processor 810 is taken as an example. The processor 810, the memory 820, the input device 830 and the output device 840 in the electronic device may be connected via a bus or other means. In FIG. 32, connection through a bus is taken as an example.

The memory 820 as a computer-readable storage medium may be used to store software programs, computer-executable programs and modules, such as program instructions/modules corresponding to the method of task creation in the embodiments of the present invention. The processor 810 executes various functional applications and data processing of the electronic device by running software programs, instructions and modules stored in the memory 820, that is, implements the method provided by the embodiments of the present invention.

The memory 820 may primarily include a stored program region, which may store an operating system, an application program required for at least one function; and a stored data area, which may store data created based on the use of terminals. In addition, the memory 820 may include high-speed random access memory and may also include non-volatile memory, such as at least one disk storage device, flash memory device, or other non-volatile solid-state storage device. In some examples, the memory 820 may further include memory remotely set relative to the processor 810, which may be connected to a computer device via a network. Examples of the above networks include, but are not limited to, the Internet, an intranet, a local area network, a mobile communication network, and combinations thereof.

The input device 830 may be used to receive input digital or character information, and generate key signal inputs related to user settings and function control of the electronic device, and it may include a keyboard, mice, etc. The output device 840 may include a display device such as a display.

The embodiments of the present disclosure also provide a storage medium comprising computer-executable instructions for implementing the method provided in the embodiments of the present invention when executed by a computer processor.

Of course, the storage medium provided by the embodiments of the present invention a comprises computer-executable instructions, which are not limited to the method operations described above, and may also perform relevant operations in the method provided by any embodiment of the present invention.

The present disclosure further provides a computer program product, when running on a computer, causing the computer to execute the method of the application of the foregoing embodiments.

In a first aspect, the present disclosure provides a method of task creation comprising:

in response to a triggering operation of creating a first task for a single file message in a session, determining a first title name of the first task based on a file name of a file corresponding to the single file message; and creating the first task and filling the determined first title name in a title region of the first task.

Optionally, the file corresponding to the single file message is ceased to be attached as an attachment to the first task.

Optionally, the single file message corresponds to at least two files; determining the first title name of the first task based on the file name of the file corresponding to the single file message comprises: obtaining a file name of a first file based on a distribution of the at least two files corresponding to the single file message in the session, and determining the file name of the first file as the first title name of the first task.

Optionally, the method further comprises: filling in a note content region of the first task with a link of a session interface in which the single file message is located.

Optionally, the method further comprises: in response to a triggering operation for the link of the session interface in which the single file message is located in the note content region of the first task, displaying the session interface which comprising the single file message.

Optionally, displaying the session interface comprises: displaying the session interface, a single file message being displayed with an identification in the displayed session interface.

Optionally, the method further comprises: in response to a triggering operation of creating a second task for at least two target messages in the session, determining a second title name of the second task based on an object of the session; wherein the at least two target messages comprise at least one file message; and creating the second task and filling the determined second title name in a title region of the second task.

Optionally, the method further comprises:

filling in a note content region of the second task with a link of a session corresponding to the at least two target messages which comprising the at least two target messages.

Optionally, before creating a second task for at least two target messages in the session in response to a triggering operation, the method further comprises: in response to a selection triggering operation on the at least two target messages in the session interface, displaying a task creation button.

Optionally, before creating the first task, or before creating the second task, the method further comprises:

in response to a triggering operation of adding at least one attachment in a task panel, displaying the at least one attachment in the task panel.

Optionally, the method further comprises:

if a title region of the task panel is empty, filling in the title region based on a file name of the at least one attachment.

Optionally, filling in the title region based on a file name of the at least one attachment comprises: filling a file name of a first attachment in the at least one attachment in the title region.

In a second aspect, the embodiments of the present disclosure provide an apparatus for task creation comprising:

a first task title determination module configured to in response to a triggering operation of creating a first task for a single file message in a session, determine a first title name of the first task based on a file name of a file corresponding to the single file message; and a first task creation module configured to create the first task and fill the determined first title name in a title region of the first task.

Optionally, the file corresponding to the single file message is ceased to be attached as an attachment to the first task.

Optionally, the apparatus further comprises:

a first task title determination unit for obtaining a file name of a first file based on a distribution of the at least two files corresponding to the single file message in the session, and determining the file name of the first file as the first title name of the first task, the single file message corresponding to at least two files.

Optionally, the apparatus further comprises:

a first task content filling module for filling in a note content region of the first task with a link of a session interface in which the single file message is located.

Optionally, the apparatus further comprises:

a display module for in response to a triggering operation for the link of the session interface in which the single file message is located in the note content region of the first task, displaying the session interface which comprising the single file message.

Optionally, the display module is used for displaying the session interface, a single file message with identification displayed in the session interface.

Optionally, the apparatus further comprises:

a second task title determination means for in response to a triggering operation of creating a second task for at least two target messages in the session, determining a second title name of the second task based on an object of the session; wherein the at least two target messages comprise at least one file message; and a second task creation module for creating the second task and filling the determined second title name in a title region of the second task.

Optionally, the apparatus further comprises:

a second task content filling module for filling in a note content region of the second task with a link of a session corresponding to the at least two target messages which comprising the at least two target messages.

Optionally, the apparatus further comprises:

a task creation button display module for in response to a selection triggering operation on the at least two target messages in the session interface, displaying a task creation button.

Optionally, the apparatus further comprises: an attachment display module for in response to a triggering operation of adding at least one attachment in a task panel, displaying the at least one attachment in the task panel.

Optionally, the apparatus further comprises:

a title region file name determination module for if a title region of the task panel is empty, filling in the title region based on a file name of the at least one attachment.

Optionally, the title region file name determination module is used for filling a file name of a first attachment in the at least one attachment in the title region.

In a third aspect, the embodiments of the present disclosure provide an electronic device comprising:

one or more processors; and a storage device for storing one or more programs, the one or more programs, when executed by the one or more processors, causing the one or more processors to implement the method according to any of the first aspects.

In a fourth aspect, the embodiments of the present disclosure provide a non-transitory computer-readable storage medium having a computer program stored thereon, wherein the program, when executed by a processor, implements the method according to any of the first aspects.

Herein, it should be noted that relational terms such as "first" and "second" are only used to distinguish one entity or operation from another entity or operation, and do not necessarily require or imply any actual relationship or order between these entities or operations. Moreover, the terms "comprises", "comprising", or any other variant thereof are intended to cover non-exclusive inclusion, so that a process, method, article, or device that includes a series of elements not only includes those elements, but also includes other elements not explicitly listed, or includes elements inherent to such a process, method, article, or device. Without further limitation, an element defined by the phrase "comprises a . . . " does not exclude the presence of additional identical elements in the process, method, article, or device that includes the element.

The foregoing is merely a detailed description of the present disclosure to enable those skilled in the art to understand or implement the present disclosure. Various modifications to these embodiments will be apparent to those skilled in the art, and the general principles defined herein may be implemented in other embodiments without departing from the spirit or scope of the present disclosure. Accordingly, the present disclosure will not be limited to the embodiments described herein, but will be subject to the widest scope consistent with the principles and novel features disclosed herein.

We claim:

1. A method of task creation, comprising:
in response to a triggering operation of creating a first task for a single file message in a session, determining a first title name of the first task based on a file name of a file corresponding to the single file message;
creating the first task and filling the determined first title name in a title region of the first task; and
filling in a note content region of the first task with a link of a session interface in which the single file message is located.

2. The method of claim 1, wherein,
the file corresponding to the single file message is ceased to be attached as an attachment to the first task.

3. The method of claim 1, wherein the single file message corresponds to at least two files;
determining the first title name of the first task based on the file name of the file corresponding to the single file message comprises:
obtaining a file name of a first file based on a distribution of the at least two files corresponding to the single file message in the session, and determining the file name of the first file as the first title name of the first task.

4. The method of claim 1, further comprising:
in response to a triggering operation for the link of the session interface in which the single file message is located in the note content region of the first task, displaying the session interface which comprising the single file message.

5. The method of claim 4, wherein displaying the session interface comprises:
displaying the session interface, a single file message being displayed with an identification in the displayed session interface.

6. The method of claim 1, further comprising:
in response to a triggering operation of creating a second task for at least two target messages in the session, determining a second title name of the second task based on an object of the session; wherein the at least two target messages comprise at least one file message; and
creating the second task and filling the determined second title name in a title region of the second task.

7. The method of claim 6, further comprising:
filling in a note content region of the second task with a link of a session corresponding to the at least two target messages which comprising the at least two target messages.

8. The method of claim 6, before creating a second task for at least two target messages in the session in response to a triggering operation, the method further comprising:
in response to a selection triggering operation on the at least two target messages in the session interface, displaying a task creation button.

9. The method of claim 1, further comprising:
in response to a triggering operation of adding at least one attachment in a task panel, displaying the at least one attachment in the task panel.

10. The method of claim 9, further comprising:
if a title region of the task panel is empty, filling in the title region based on a file name of the at least one attachment.

11. The method of claim 10, wherein filling in the title region based on a file name of the at least one attachment comprises: filling a file name of a first attachment in the at least one attachment in the title region.

12. An electronic device, comprising:
one or more processors; and
a storage device for storing one or more programs,
the one or more programs, when executed by the one or more processors, causing the one or more processors to implement acts comprising:
in response to a triggering operation of creating a first task for a single file message in a session, determining a first title name of the first task based on a file name of a file corresponding to the single file message;
creating the first task and filling the determined first title name in a title region of the first task; and
filling in a note content region of the first task with a link of a session interface in which the single file message is located.

13. The device of claim 12, wherein,
the file corresponding to the single file message is ceased to be attached as an attachment to the first task.

14. The device of claim 12, wherein the single file message corresponds to at least two files;
determining the first title name of the first task based on the file name of the file corresponding to the single file message comprises:
obtaining a file name of a first file based on a distribution of the at least two files corresponding to the single file message in the session, and determining the file name of the first file as the first title name of the first task.

15. The device of claim 12, the acts further comprising:
in response to a triggering operation for the link of the session interface in which the single file message is located in the note content region of the first task, displaying the session interface which comprising the single file message.

16. The device of claim 15, wherein displaying the session interface comprises:
displaying the session interface, a single file message being displayed with an identification in the displayed session interface.

17. The device of claim 12, the acts further comprising:
in response to a triggering operation of creating a second task for at least two target messages in the session, determining a second title name of the second task based on an object of the session; wherein the at least two target messages comprise at least one file message; and
creating the second task and filling the determined second title name in a title region of the second task.

18. A non-transitory computer readable storage medium having a computer program stored thereon, wherein the program, when executed by a processor, implements acts comprising:
in response to a triggering operation of creating a first task for a single file message in a session, determining a first title name of the first task based on a file name of a file corresponding to the single file message;

creating the first task and filling the determined first title name in a title region of the first task; and filling in a note content region of the first task with a link of a session interface in which the single file message is located.

* * * * *